US012763452B2

(12) United States Patent
Takeuchi et al.

(10) Patent No.: US 12,763,452 B2
(45) Date of Patent: Oct. 13, 2026

(54) PLANAR ANTENNA AND VEHICLE WINDOW GLASS

(71) Applicant: AGC Inc., Tokyo (JP)

(72) Inventors: Shoichi Takeuchi, Tokyo (JP); Yusuke Kato, Tokyo (JP); Toshiki Sayama, Tokyo (JP); Hideaki Shoji, Tokyo (JP)

(73) Assignee: AGC INC., Tokyo (JP)

( * ) Notice: Subject to any disclaimer, the term of this patent is extended or adjusted under 35 U.S.C. 154(b) by 235 days.

(21) Appl. No.: 18/635,194

(22) Filed: Apr. 15, 2024

(65) Prior Publication Data

US 2024/0275020 A1 Aug. 15, 2024

Related U.S. Application Data

(63) Continuation of application No. PCT/JP2022/038166, filed on Oct. 13, 2022.

(30) Foreign Application Priority Data

Oct. 18, 2021 (JP) ................................ 2021-170476
Mar. 17, 2022 (JP) ................................ 2022-043208

(51) Int. Cl.
*H01Q 1/12* (2006.01)
*H01Q 5/364* (2015.01)
*H01Q 13/10* (2006.01)

(52) U.S. Cl.
CPC .......... *H01Q 1/1271* (2013.01); *H01Q 5/364* (2015.01); *H01Q 13/106* (2013.01)

(58) Field of Classification Search
CPC .... H01Q 1/1271; H01Q 5/364; H01Q 13/106; H01Q 13/16
See application file for complete search history.

(56) References Cited

U.S. PATENT DOCUMENTS 10,290,932 B2 5/2019 Takeuchi et al.
10,297,897 B2 5/2019 Hashimoto et al.
(Continued)

FOREIGN PATENT DOCUMENTS

WO WO-2017/018324 A1 2/2017
WO WO-2017/089435 A1 6/2017

OTHER PUBLICATIONS

International Searching Authority, "International Search Report," issued in connection with International Patent Application No. PCT/JP2022/038166, dated Jan. 10, 2023.
(Continued)

*Primary Examiner* — Amal Patel
(74) *Attorney, Agent, or Firm* — Foley & Lardner LLP

(57) ABSTRACT

A planar antenna comprising a slot formed in a flat conductor, wherein the slot includes a first slot extending in a first direction between a first feeding point and a second feeding point, a second slot extending in a second direction different from the first direction from an end portion of the first slot, a third slot extending in a fourth direction opposite to the second direction from an end portion of the first slot in a third direction opposite to the first direction, reaching an open end in the fourth direction, and a J-shaped slot extending from an end portion of the second slot in the second direction to an open end open in the first direction, and wherein a slot width at an open end of the J-shaped slot is wider than a slot width at the end portion of the second slot in the second direction.

17 Claims, 31 Drawing Sheets

(56) References Cited

U.S. PATENT DOCUMENTS

| | | | | |
|---|---|---|---|---|
| 11,171,404 | B2 | 11/2021 | Takeuchi et al. | |
| 2015/0145743 | A1 * | 5/2015 | Du | H01Q 9/285 343/807 |
| 2020/0251804 | A1 * | 8/2020 | Takeuchi | H01Q 13/16 |

OTHER PUBLICATIONS

International Searching Authority, "Written Opinion," issued in connection with International Patent Application No. PCT/JP2022/038166, dated Jan. 10, 2023.

* cited by examiner

PLANAR ANTENNA AND VEHICLE WINDOW GLASS

This application is a continuation of PCT Application No. PCT/JP2022/038166, filed on Oct. 13, 2022, which is based upon and claims the benefit of priority from Japanese Patent Application No. 2021-170476 filed on Oct. 18, 2021 and Japanese Patent Application No. 2022-043208 filed on Mar. 17, 2022. The contents of those applications are incorporated herein by reference in their entireties.

TECHNICAL FIELD

The present disclosure relates to a planar antenna and a vehicle window glass.

BACKGROUND ART

Heretofore, a planar slot antenna formed in a conductive film is known as an antenna provided at a vehicle window glass (see, for example, Patent Document 1).

PRIOR ART DOCUMENTS

Patent Documents

Patent Document 1: WO2017/018324

DISCLOSURE OF INVENTION

Technical Problem

The slot antenna disclosed in Patent Document 1 is suitable for transmission and reception of radio waves in a frequency band up to about 2.69 GHZ. However, it is not easy to extend the frequency band in which impedance matching can be performed to a relatively high frequency band up to about 6 GHZ.

The present disclosure provides a wide-band planar antenna capable of supporting a relatively high frequency band up to about 6 GHz and a vehicle window glass including the planar antenna.

Solution to Problem

According to an aspect of the present disclosure, provided are a planar antenna and a vehicle window glass that includes the planar antenna, the planar antenna comprising:
- a slot formed in a flat conductor,
- wherein the slot includes
  - a first slot extending in a first direction between a first feeding point and a second feeding point,
  - a second slot extending in a second direction different from the first direction from an end portion of the first slot in the first direction,
  - a third slot extending in a fourth direction opposite to the second direction from an end portion of the first slot in a third direction opposite to the first direction, reaching an open end open in the fourth direction, and
  - a J-shaped slot extending in a J-shape from an end portion of the second slot in the second direction to an open end open in the first direction, and
- wherein a slot width at an open end of the J-shaped slot is wider than a slot width at the end portion of the second slot in the second direction.

According to another aspect of the present disclosure, provided are a planar antenna and a vehicle window glass that includes the planar antenna, the planar antenna comprising:
- a slot formed in a flat conductor,
- wherein the slot includes
  - a first slot extending in a first direction between a first feeding point and a second feeding point,
  - a second slot extending in a second direction different from the first direction from an end portion of the first slot in the first direction,
  - a third slot extending in a fourth direction opposite to the second direction from an end portion of the first slot in a third direction opposite to the first direction, reaching an open end open in the fourth direction, and
  - a seventh slot extending from an end portion of the second slot in the second direction to an open end open in the third direction,
- wherein a slot width at an open end of the seventh slot is wider than a slot width at the end portion of the second slot in the second direction, and
- wherein a slot length of the second slot is shorter than a slot length of the first slot.

Advantageous Effects of Invention

According to the present disclosure, a wide-band planar antenna capable of supporting a relatively high frequency band up to about 6 GHz and a vehicle window glass including the planar antenna can be provided.

DESCRIPTION OF EMBODIMENTS

Figure 1:
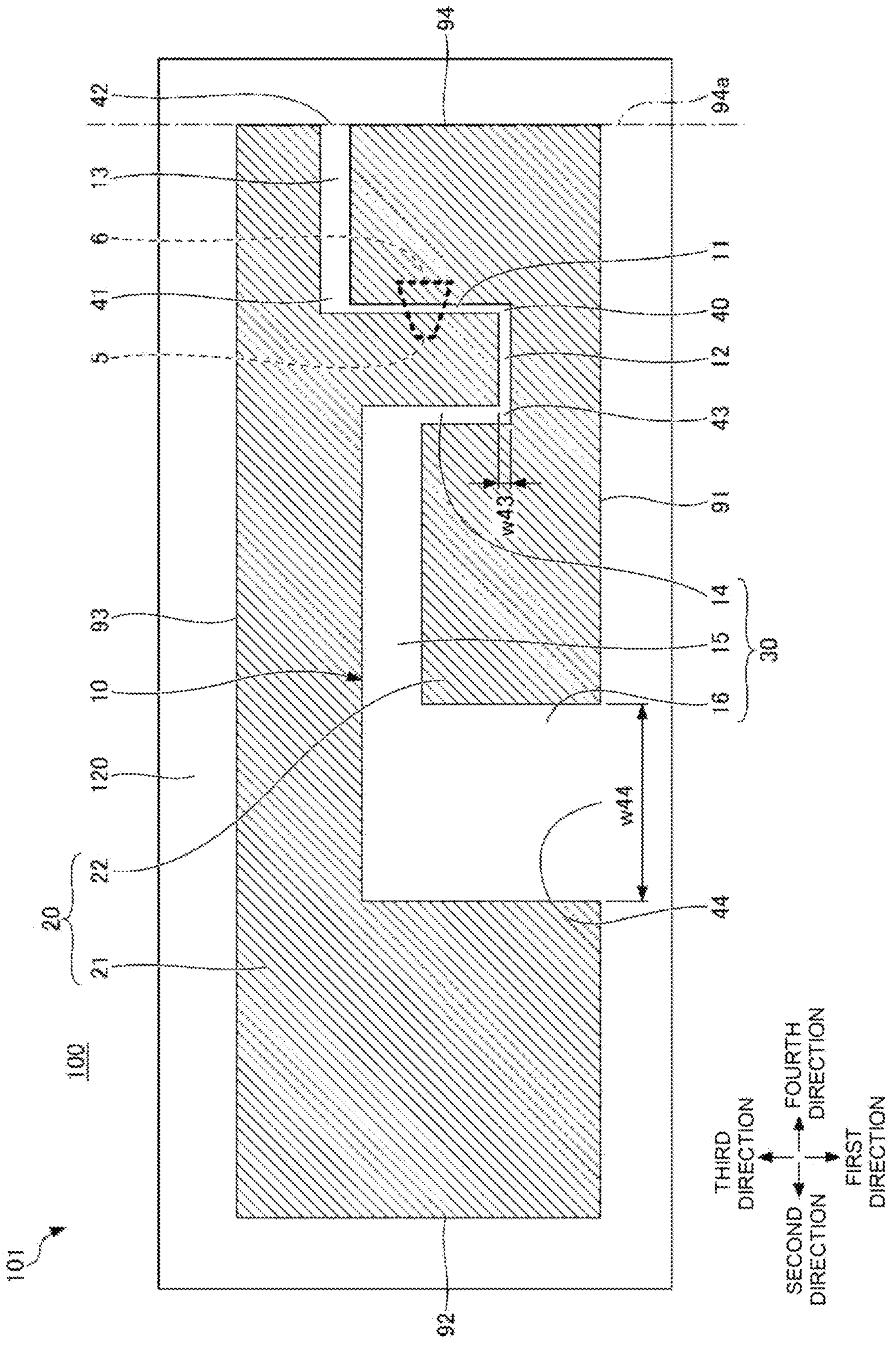
FIG. 1 is a plan view illustrating a configuration example of a planar antenna according to a first embodiment.

An embodiment of the present disclosure will now be described below with reference to the drawing. For easy understanding of the embodiment, the scales of the individual elements in the drawings may be represented differently from those of the actual elements. Terms representing directions, such as "parallel", "at right angles", "perpendicular", "horizontal", "vertical", "top-bottom", and "left-right", and terms representing "same" and "equal" are not necessarily to be interpreted in an exact sense, and a certain range of deviation is allowed as long as the operations and the effects of the embodiment are not impaired.

Examples of a vehicle window glass of the present embodiment include a rear glass attached to a rear portion of a vehicle, a windshield attached to a front portion of a vehicle, a side glass attached to a side portion of a vehicle, and a roof glass attached to a ceiling portion of a vehicle. The vehicle window glass is not limited to these examples. In the present embodiment, the vehicle window glass will hereinafter also be simply referred to as a window glass.

FIG. 1 is a plan view illustrating a configuration example of a planar antenna according to the first embodiment. A planar antenna 101 illustrated in FIG. 1 is a slot antenna that includes a slot 10 formed in a flat conductor 20. FIG. 1 is a plan view illustrating the planar antenna 101 attached to a portion of a main surface of a window glass 100 when the window glass 100 or the planar antenna 101 is viewed in a plan view. Note that the planar antennas according to the first embodiment and the other embodiments, which will be described later, are not limited to being provided on the main surface of the window glass 100 and may be provided on, for example, a main surface of a dielectric substrate such as a resin substrate. Examples of the resin substrate include a resin back door for a vehicle and aero parts for a vehicle such as a resin spoiler.

A first direction, a second direction, a third direction, and a fourth direction are directions when the window glass 100 or the planar antenna 101 is viewed in a plan view. The third direction is a direction opposite to the first direction. The fourth direction is a direction opposite to the second direction. In the present embodiment, among the first direction, the second direction, the third direction, and the fourth direction, adjacent directions cross at right angles (may cross at approximately right angles). These descriptions are also applied to the other plan views.

The planar antenna 101 includes the flat conductor 20 in which the slot 10 is formed. The slot 10 is an elongated cutout formed in the conductor 20.

The conductor 20 is an example of a film-shaped or plate-shaped flat conductor. In this case, the conductor 20 is an electroconductive film (a film having electrical conductivity) whose external shape is substantially rectangular when seen as a whole. In the first embodiment, the conductor 20 has an outer edge 91 on the first direction side, an outer edge 92 on the second direction side, an outer edge 93 on the third direction side, and an outer edge 94 on the fourth direction side.

The conductor 20 includes a flat first conductor 21 extending toward one side with respect to the slot 10 and a flat second conductor 22 extending toward the other side with respect to the slot 10. In the present embodiment, the first conductor 21 and the second conductor 22 are separated from each other by the slot 10. The conductor 20 including the first conductor 21 and the second conductor 22 may be attached to the main surface of the window glass 100 directly or with a dielectric layer 120 interposed therebetween.

The planar antenna 101 may include the dielectric layer 120 in which the flat conductor 20 including the first conductor 21 and the second conductor 22 is formed. The conductor 20 may be a conductor formed by firing a paste containing a conductive metal (e.g., a silver paste or the like). The dielectric layer 120 may be made of a black ceramic. In addition, for example, the planar antenna 101 may include a substrate (e.g., a flexible wiring board) in which the flat conductor 20 including the first conductor 21 and the second conductor 22 is laminated on the dielectric layer 120. The dielectric layer 120 may be made of a resin such as a polyimide, and the conductor 20 may be made of copper or the like. By the planar antenna 101 having such a multilayer structure, variations in the dimensions of the slot 10 and the like can be reduced even though the conductor 20 is divided into the first conductor 21 and the second conductor 22. In addition, this facilitates attachment of the planar antenna 101 to an attachment surface such as the main surface of the window glass 100.

The first conductor 21 has a first feeding point 5 to which a signal line (not shown) is electrically connected, and the second conductor 22 has a second feeding point 6 to which a ground line (not shown) is electrically connected. For example, an inner conductor (a signal line) at one end of a coaxial cable is electrically connected to the first feeding point 5, and an outer conductor (a ground line) at the one end of the coaxial cable is electrically connected to the second feeding point 6. To the other end of the coaxial cable, for example, a device having either or both of a transmission function and a reception function is connected. The area of the first conductor 21 is larger than the area of the second conductor 22.

The slot 10 includes a slot 11, a slot 12, a slot 13, and a J-shaped slot 30. The slot 13, the slot 11, the slot 12, and the J-shaped slot 30 are continuously connected to one another in this connection order.

The slot 11 is an example of a first slot and extends in the first direction between the first feeding point 5 and the second feeding point 6.

The slot 12 is an example of a second slot and extends in the second direction, which is different from the first direction, from an end portion 40 of the slot 11 in the first direction.

The slot 13 is an example of a third slot. The slot 13 extends in the fourth direction from an end portion 41 and reaches an open end 42. The end portion 41 is an example of an end portion of the first slot on the side opposite to the first direction. The open end 42 is an example of an open end open in the fourth direction. The open end 42 is open at the outer edge 94 toward the fourth direction.

The J-shaped slot 30 is an example of a J-shaped slot. The J-shaped slot 30 extends from an end portion 43 to an open end 44 in a J-shape. The end portion 43 is an example of an end portion of the second slot in the second direction. The open end 44 is an example of an open end open in the first direction. The open end 44 is open at the outer edge 91 toward the first direction.

A slot width w44 at the open end 44 of the J-shaped slot 30 is wider than a slot width w43 at the end portion 43 of the slot 12 in the second direction.

Here, in a case where a vehicle body is made of a metal, when a radiation element of a linear antenna made of a silver paste is provided at a position close to the vehicle body, on the window glass, the reception gain of the antenna tends to decrease due to interference with the metal.

However, since the planar antenna 101 according to the present embodiment a slot antenna, an electric field generated by a current flowing through the conductor 20 is formed to be closed inside the conductor 20, and is therefore unlikely to be affected by interference with a metal or a resin.

Thus, the planar antenna 101 according to the present embodiment can achieve a stable characteristic even if a metal contained in a defogger, the vehicle body, or the like is close to a peripheral portion of the planar antenna 101 or even if a resin portion of the vehicle body is close to a peripheral portion of the planar antenna 101. In addition, even in a case where a metal film such as a transparent conductive film is formed at the peripheral portion, similarly, a characteristic that is less likely to be affected by interference can be obtained.

Frequencies utilized for communication waves vary depending on the countries, and even in a single country, the frequency bands utilized vary depending on the carrier. Thus, a wide-band antenna capable of transmitting and receiving a plurality of communication waves is preferable.

The planar antenna 101 according to the first embodiment includes a plurality of slots including the slot 11, the slot 12, the slot 13, and the J-shaped slot 30. The planar antenna 101 including such a plurality of slots is impedance-matched so as to be suitable for transmission and reception of radio waves in a relatively high frequency band within an ultra-high frequency (UHF) range and in the frequency band (sub-6) from 600 MHz to 6 GHz used for the 5th generation communication (5G) standard.

The planar antenna 101 may be impedance-matched so as to efficiently transmit and receive radio waves for Wi-Fi, which is a wireless local area network (LAN). The planar antenna 101 may be impedance-matched so as to transmit and receive radio waves in frequency bands (863 MHz to 868 MHZ (Europe), 902 MHz to 928 MHz (the United States), 2400 MHz to 2497 MHz (worldwide), 5150 MHz to 5350 MHz (worldwide), and 5470 MHz to 5850 MHZ (worldwide), and so forth) that are specified by communication standards such as IEEE 802.11a, b, g, n, ac, ah, and ax.

The planar antenna 101 may be impedance-matched so as to transmit and receive radio waves at frequencies of 2400 MHz to 2483.5 MHz used for Bluetooth (Registered Trademark). The planar antenna 101 may be impedance-matched so as to transmit and receive radio waves in frequency bands (755.5 MHz to 764.5 MHz specified by ARIB STD-T109 (Japan) and 5850 MHz to 5925 MHz specified by IEEE 802.11p, and the like) used for vehicle-to-infrastructure (V2I) or vehicle-to-vehicle (V2V) communication in intelligent transport systems (ITS). The planar antenna 101 may be impedance-matched so as to transmit and receive radio waves in frequency bands (2300 MHz to 2400 MHZ, 2496 MHz to 2690 MHZ, 3400 MHz to 3600 MHZ, and the like) used for WiMAX (Registered Trademark), which is another wireless communication technology. The planar antenna 101 may be impedance-matched so as to transmit and receive radio waves in a low band (3245 MHz to 4742 MHz) of an ultra-wideband (UWB) wireless communication system.

As described above, according to the first embodiment, a wide-band planar antenna capable of supporting a relatively high frequency band up to about 6 GHZ can be obtained, and in addition, a vehicle window glass including the planar antenna can be obtained.

In the case illustrated in FIG. 1, the J-shaped slot 30 is a slot bent in a J-shape and is formed such that a straight line is bent into a J-shape. Accordingly, the J-shaped slot 30 includes a plurality of line segment slots that differ from one another in at least one of the extending direction and the length, and thus, the frequency at which impedance matching is performed can be easily adjusted.

In the case illustrated in FIG. 1, the J-shaped slot 30 includes a plurality of line segment slots (a slot 14, a slot 15, and a slot 16). The slot 14 is an example of a fourth slot and extends in the third direction from the end portion 43. The slot 15 is an example of a fifth slot and extends in the second direction from an end portion of the slot 14 in the third direction. The slot 16 is an example of a sixth slot and extends in the first direction from an end portion of the slot 15 in the second direction to the open end 44.

The J-shaped slot 30 may include a portion that extends in the first direction while maintaining an approximately uniform slot width. In the case illustrated in FIG. 1, the slot 16 extends in the first direction while maintaining an approximately uniform slot width. However, the J-shaped slot 30 may include a portion that extends in the first direction while its slot width gradually increases or gradually decreases. For example, the slot 16 may extend in the first direction while its slot width gradually increases or gradually decreases toward the open end 44.

In the case illustrated in FIG. 1, the slot width of the slot 16 is wider than the slot width of the slot 15, and the slot width of the slot 15 is wider than the slot width of the slot 14. This facilitates impedance matching in a frequency band within a range of 600 MHz to 6 GHz. Note that the above-mentioned frequency band also includes, for example, the frequency band of 617 MHz to 652 MHz defined as 5G band n71.

In the case illustrated in FIG. 1, the slot length of the slot 15 is longer than the slot length of the slot 14 and longer than the slot length of the slot 16, and thus, the shape of the planar antenna 101 can be horizontally long in the second direction or the fourth direction, so that the external dimension of the planar antenna 101 in the first direction or the third direction can be shortened. Consequently, when the planar antenna 101 is attached to the window glass 100 such that the outer edge 91 or the outer edge 93 extends along a window frame (not shown), the field of view through the window glass 100 is less likely to be blocked by the planar antenna 101. The window frame is a flange to which the window glass 100 is attached.

In the case illustrated in FIG. 1, the slot 13 includes a portion where a slot width is wider than that of the slot 11. This makes it easy to perform impedance matching in a frequency band within the range of 600 MHz to 6 GHZ. However, the slot width of the slot 13 may be the same as or narrower than the slot width of the slot 11.

As illustrated in FIG. 1, it is preferable that the slot length of the slot 12 be shorter than the slot length of the slot 11. This facilitates impedance matching in a high frequency band of 2.69 GHz to 6 GHZ.

In the case illustrated in FIG. 1, the outer edge 94 where the open end 42 of the slot 13 is located includes a portion parallel to an imaginary line 94*a* that passes through the open end 42 of the slot 13 and that extends at right angles to the extending direction of the slot 13. However, the outer edge 94 may include a portion inclined with respect to the imaginary line 94*a*.

Figure 2:
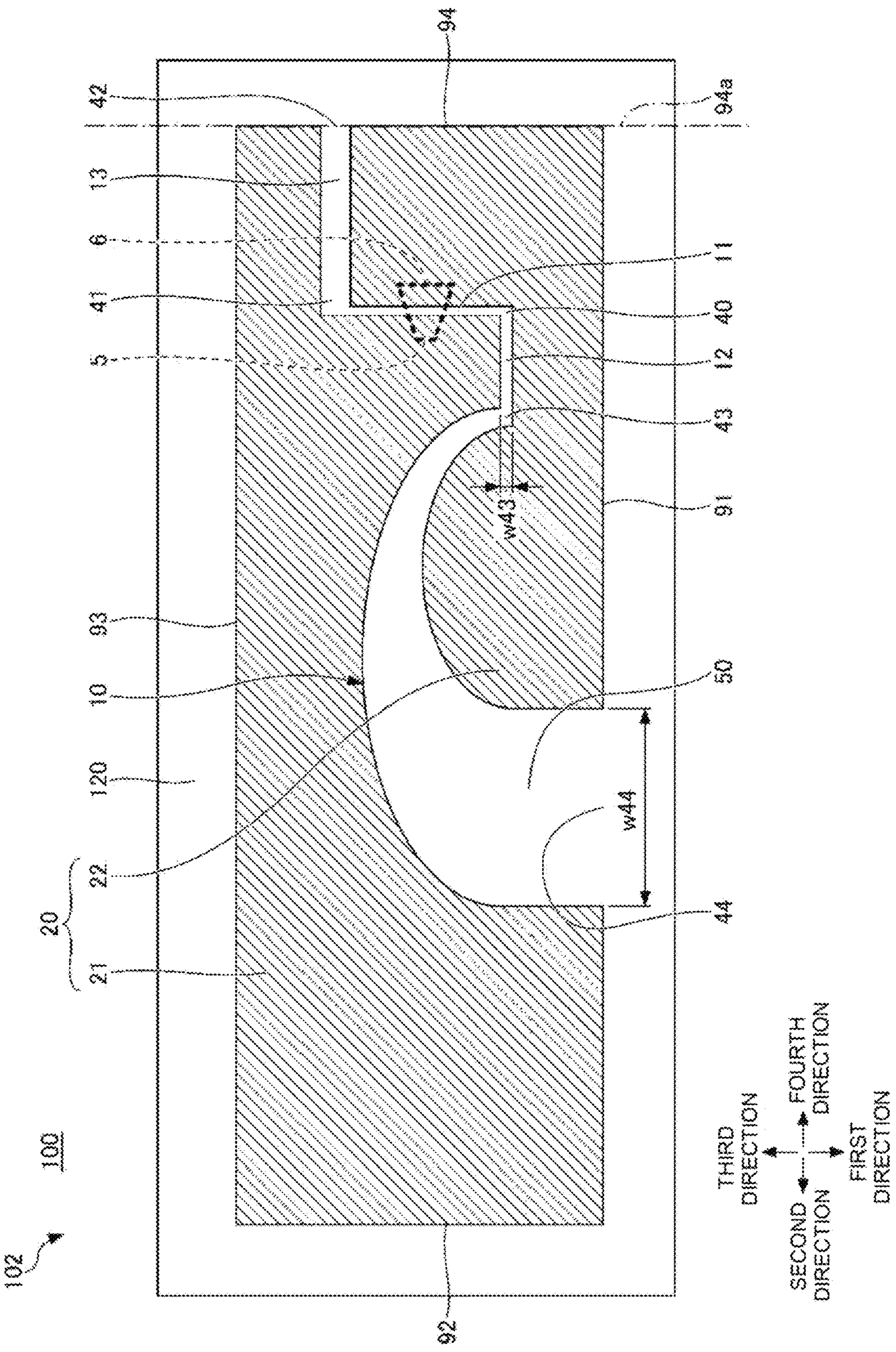
FIG. 2 is a plan view illustrating a configuration example of a planar antenna according to a second embodiment.

FIG. 2 is a plan view illustrating a configuration example of a planar antenna according to the second embodiment. The descriptions of the configuration and effect similar to those of the above-described embodiment will be omitted by incorporating the above descriptions. In a planar antenna 102 illustrated in FIG. 2, a J-shaped slot 50 has a curved outline. By the J-shaped slot 50 having the curved outline, a frequency band over which the planar antenna 102 can perform transmission and reception operations can be widened.

The J-shaped slot 50 may include a portion where a slot width gradually increases. This can widen the frequency band over which the planar antenna 102 can perform the transmission and reception operations. As illustrated in FIG. 2, the J-shaped slot 50 may include a portion that extends from the end portion 43 of the slot 12 in the second direction while its slot width gradually increases and then extends in the first direction while maintaining an approximately uniform slot width.

The J-shaped slot 50 may have an outline resembling half of an ellipse with a long axis approximately parallel to the second direction. In this case, the outline of the J-shaped slot 50 has a smooth curve, so that the frequency band over which the planar antenna 102 can perform the transmission and reception operations can be widened. In particular, the planar antenna 102 illustrated in FIG. 2 is an example in which the slot width gradually increases until the extending direction of the J-shaped slot 50 becomes parallel to the first direction and in which the slot width is approximately uniform in a portion that extends parallel to the first direction.

Figure 3:
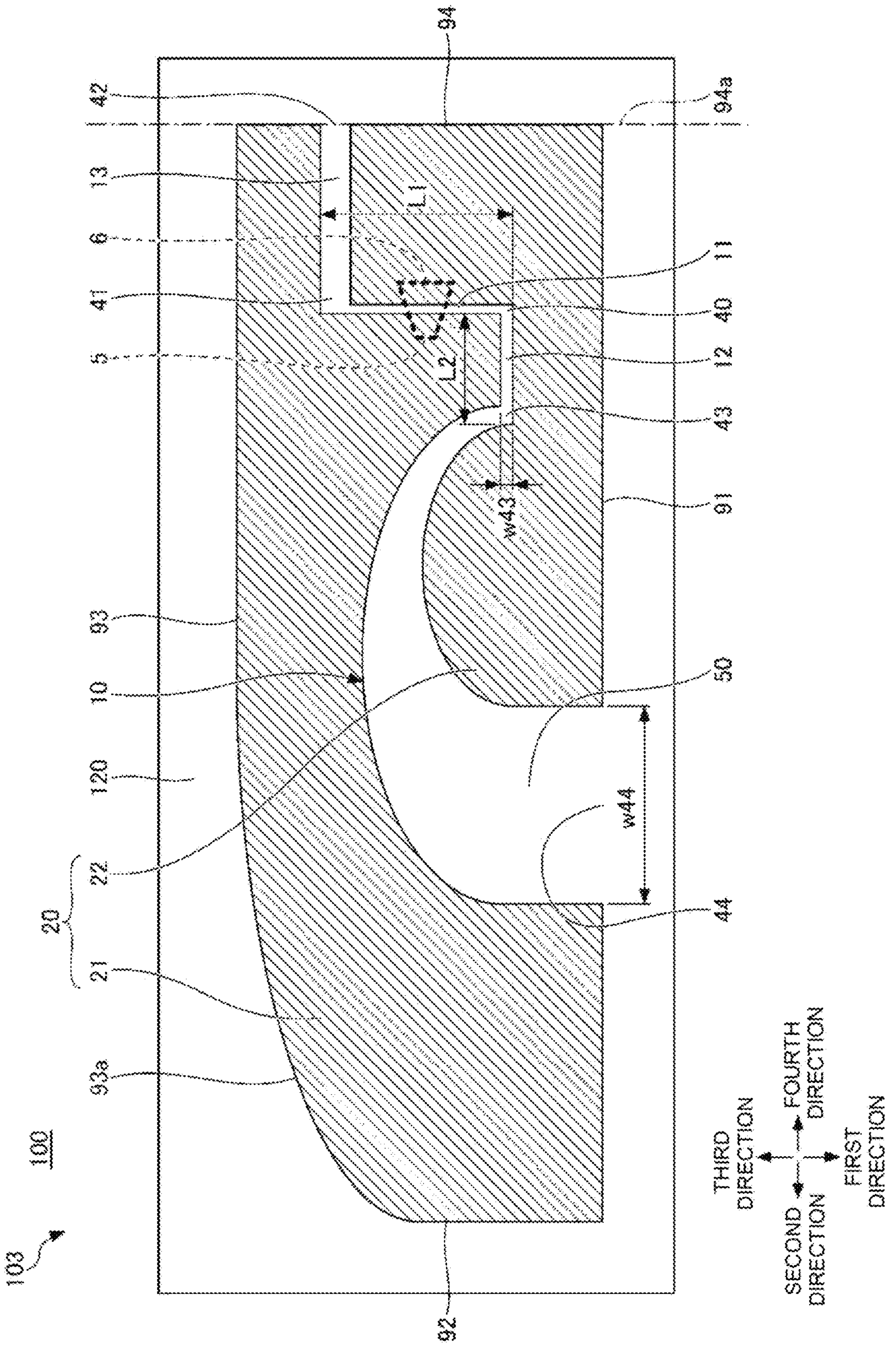
FIG. 3 is a plan view illustrating a configuration example of a planar antenna according to a third embodiment.

FIG. 3 is a plan view illustrating a configuration example of a planar antenna according to the third embodiment. The descriptions of the configuration and effect similar to those of the above-described embodiments will be omitted by incorporating the above descriptions. In a planar antenna 103 illustrated in FIG. 3, the outer edge 93 opposite to the outer edge 91 includes a curved portion 93*a*. By the outer edge 93 including the curved portion 93*a*, impedance matching in a frequency band of 750 MHz to 1 GHz is facilitated. In addition, the amount of the first conductor 21 used can be reduced, and this improves productivity. In the third embodiment, the curved portion 93*a*, which is an end portion of the outer edge 93, has an outline resembling ¼ of an ellipse with a long axis approximately parallel to the second direction. However, the curved portion 93*a* may have another curved outline such as an outline resembling ¼ or less of a circle or ellipse.

Figure 4:
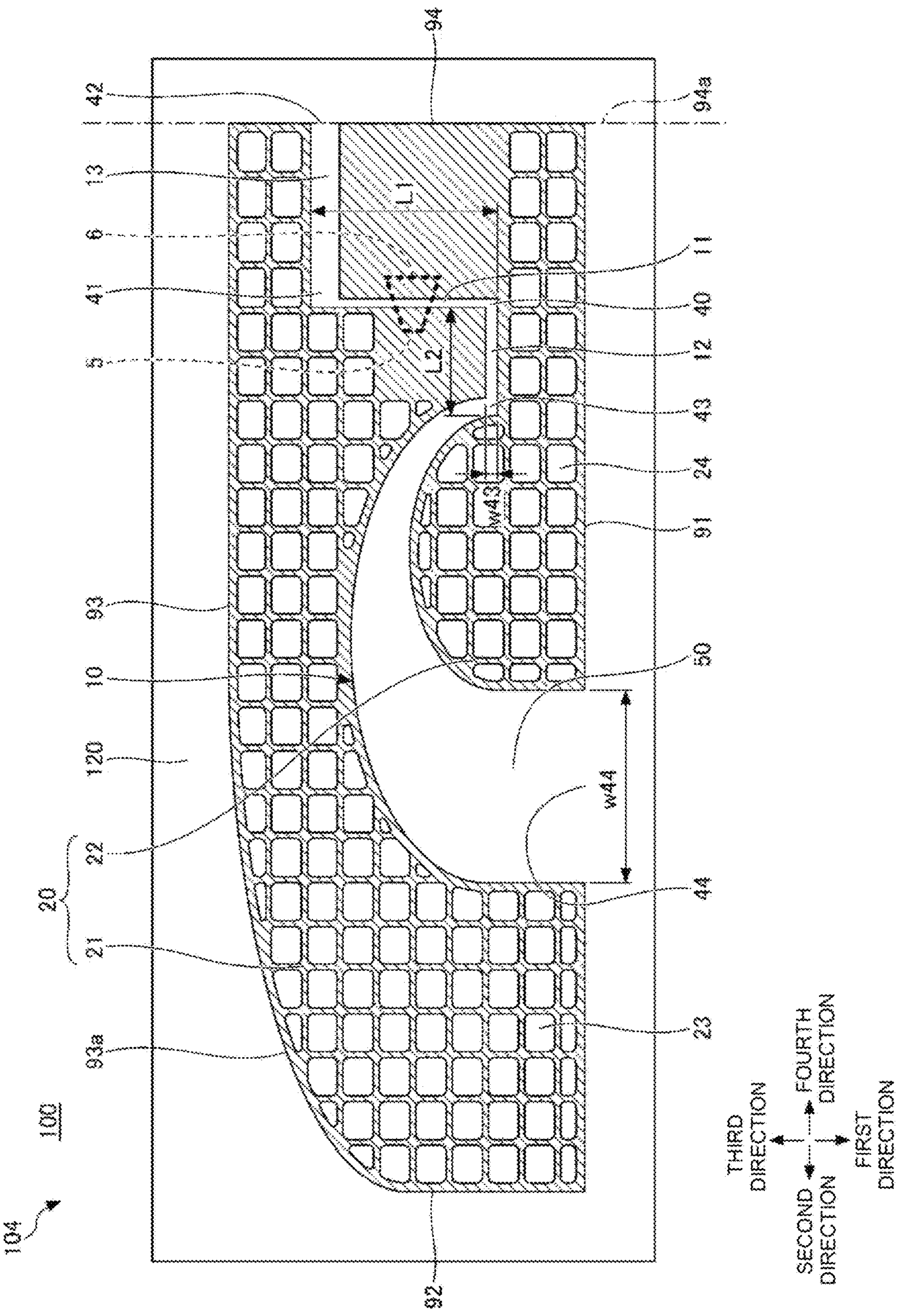
FIG. 4 is a plan view illustrating a configuration example of a planar antenna according to a fourth embodiment.

FIG. 4 is a plan view illustrating a configuration example of a planar antenna according to the fourth embodiment. The descriptions of the configuration and effect similar to those of the above-described embodiments will be omitted by incorporating the above descriptions. In a planar antenna 104 illustrated in FIG. 4, the first conductor 21 and the second conductor 22 are each formed in a grid shape with a hole portion (a punched portion) having a part of the conductor 20 punched. The punched portion may be formed in at least one of the first conductor 21 and the second conductor 22.

In a mode in which the conductor 20 is provided on the window glass 100 by printing, if a metal region of the conductor 20 is too large, the formability of the glass may sometimes decrease due to the difference in heat absorption between the glass and the metal. By forming the punched portion, the area of the conductor 20 can be increased while ensuring the formability of the glass. When the area of the conductor 20 increases, the degree of freedom when designing a slot antenna increases.

In the present embodiment, in a region where the first feeding point 5 and the second feeding point 6 are not provided, a punched portion 23 having a grid-like pattern is formed in the first conductor 21, and a punched portion 24 having a grid-like pattern is formed in the second conductor 22. Note that the shape of each punched hole of the punched portions is not limited to a quadrangular shape and may be a polygonal shape (e.g., a triangular shape or a hexagonal shape) other than a quadrangular shape and may be a circular shape or a different shape. Such a punched portion may be formed also in the other embodiments.

Figure 5:
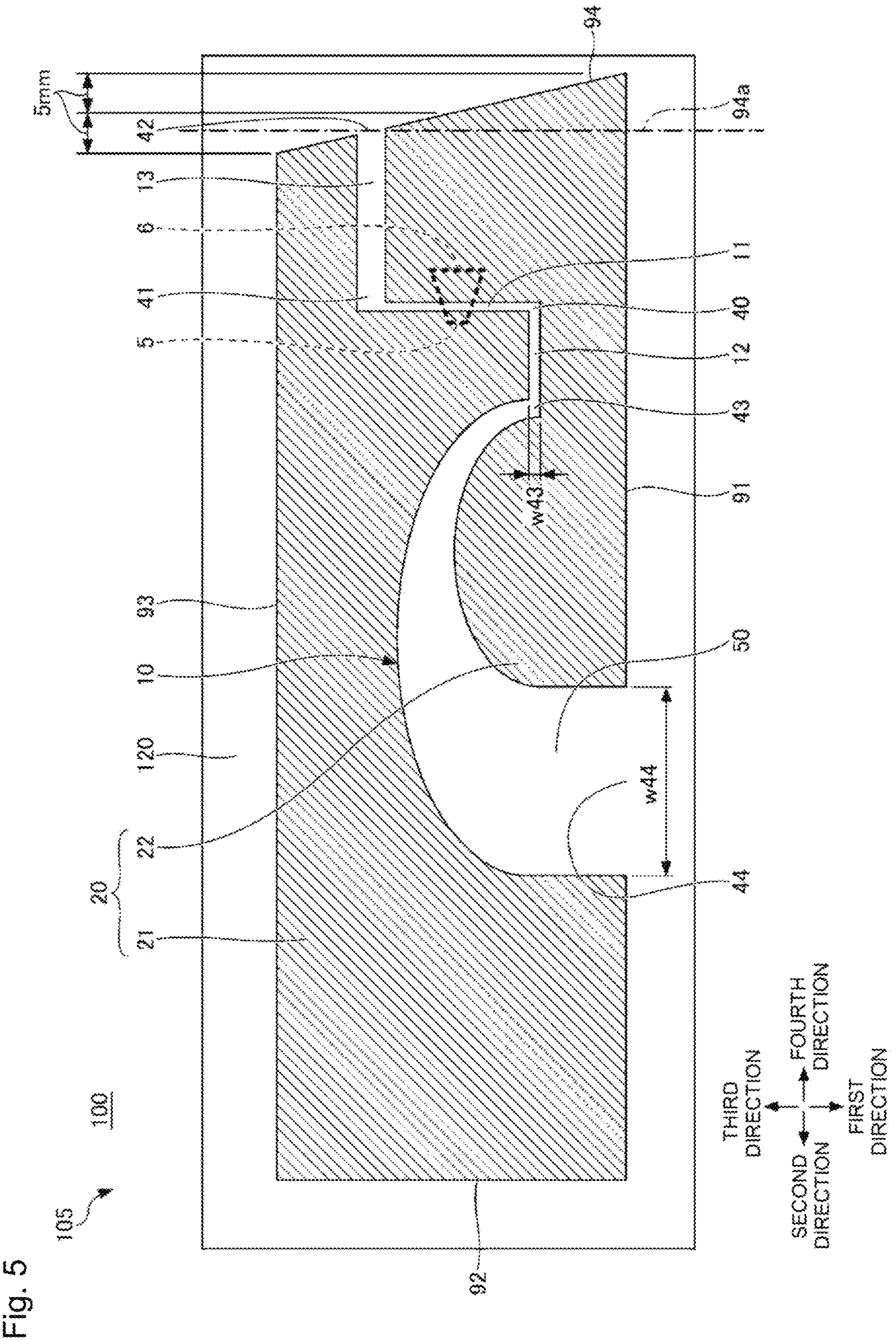
FIG. 5 is a plan view illustrating a configuration example of a planar antenna according to a fifth embodiment.

FIG. 5 is a plan view illustrating a configuration example of a planar antenna according to the fifth embodiment. The descriptions of the configuration and effect similar to those of the above-described embodiments will be omitted by incorporating the above descriptions. In a planar antenna 105 illustrated in FIG. 5, the outer edge 94 includes a portion inclined with respect to the imaginary line 94*a*. This facilitates impedance matching in a frequency band of 4 GHz to 5 GHZ. In the fifth embodiment, an outer edge portion of the outer edge 94 located between the open end 42 and the outer edge 91 projects toward the fourth direction side with respect to the imaginary line 94*a*, and an outer edge portion of the outer edge 94 located between the open end 42 and the outer edge 93 is offset toward the second direction side with respect to the imaginary line 94*a*. Note that the dimension (5 mm) of the projection and the dimension (5 mm) of the offset illustrated in FIG. 5 are examples and may be freely set.

Figure 6:
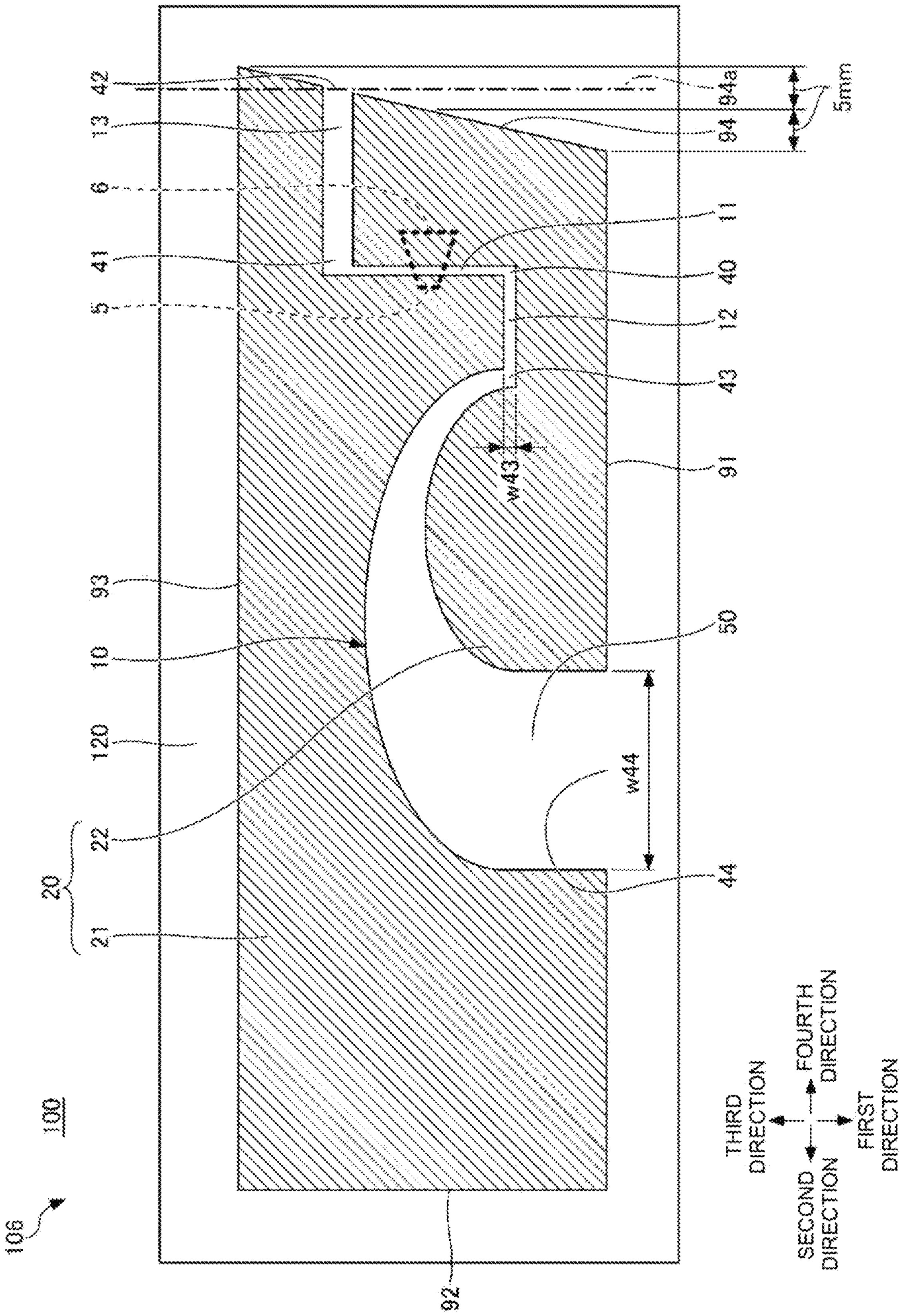
FIG. 6 is a plan view illustrating a configuration example of a planar antenna according to a sixth embodiment.

FIG. 6 is a plan view illustrating a configuration example of a planar antenna according to the sixth embodiment. The descriptions of the configuration and effect similar to those of the above-described embodiments will be omitted by incorporating the above descriptions. In a planar antenna 106 illustrated in FIG. 6, the outer edge 94 includes a portion inclined with respect to the imaginary line 94*a*. This facilitates the impedance matching in the frequency band of 4 GHz to 5 GHZ. In the sixth embodiment, an outer edge portion of the outer edge 94 located between the open end 42 and the outer edge 91 is offset toward the second direction side with respect to the imaginary line 94*a*, and an outer edge portion of the outer edge 94 located between the open end 42 and the outer edge 93 projects toward the fourth direction side with respect to the imaginary line 94*a*. Note that the dimension (5 mm) of the projection and the dimension (5 mm) of the offset illustrated in FIG. 6 are examples and may be freely set.

Figure 7:
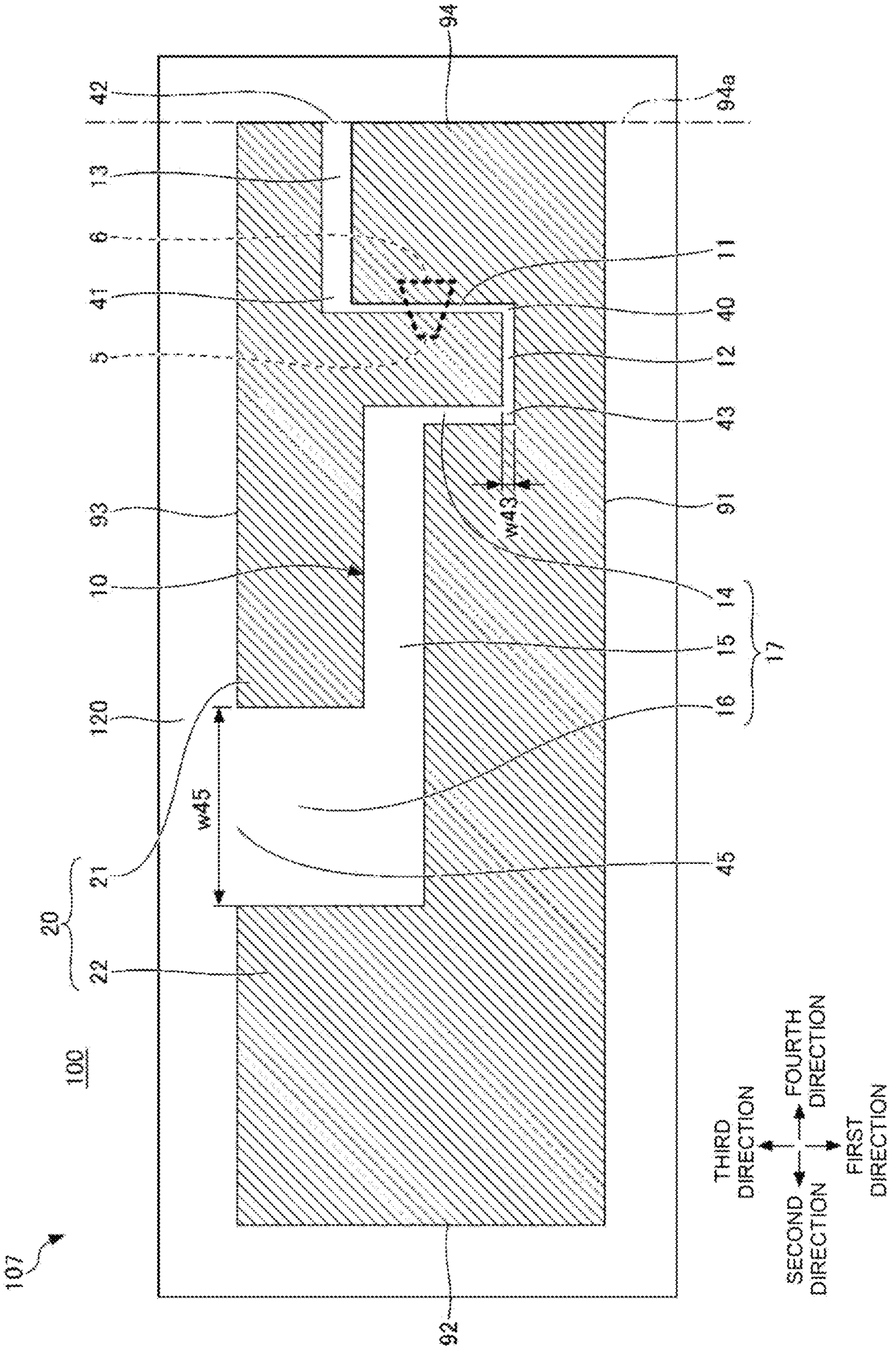
FIG. 7 is a plan view illustrating a configuration example of a planar antenna according to a seventh embodiment.

FIG. 7 is a plan view illustrating a configuration example of a planar antenna according to the seventh embodiment. The descriptions of the configuration and effect similar to those of the above-described embodiments will be omitted by incorporating the above descriptions. In a planar antenna 107 illustrated in FIG. 7, the first conductor 21 has the first feeding point 5 to which a signal line (not shown) is electrically connected, and the second conductor 22 has the second feeding point 6 to which a ground line (not shown) is electrically connected. The area of the second conductor 22 is larger than the area of the first conductor 21.

The slot 10 includes the slot 11, the slot 12, the slot 13, and a slot 17. The slot 13, the slot 11, the slot 12, and the slot 17 are continuously connected to one another in this connection order.

The slot 17 is an example of a seventh slot. The slot 17 extends from the end portion 43 to an open end 45. The open end 45 is an example of an open end open in the third direction. The open end 45 is open at the outer edge 93 toward the third direction.

A slot width w45 at the open end 45 of the slot 17 is wider than a slot width w43 at the end portion 43 of the slot 12 in the second direction.

In the case illustrated in FIG. 7, the slot 17 includes a plurality of line segment slots (the slot 14, the slot 15, and the slot 16). The slot 16 extends in the third direction from the end portion of the slot 15 in the second direction to the open end 45.

As illustrated in FIG. 7, it is preferable that the slot length of the slot 12 be shorter than the slot length of the slot 11. This facilitates the impedance matching in the high frequency band of 2.69 GHz to 6 GHz.

The slot 17 may include a portion that extends in the third direction while maintaining an approximately uniform slot width. In the case illustrated in FIG. 7, the slot 16 extends in the third direction while maintaining an approximately uniform slot width. However, the slot 17 may include a portion that extends in the third direction while its slot width gradually increases or gradually decreases. For example, the slot 17 may extend in the third direction while its slot width gradually increases or gradually decreases toward the open end 45.

Figure 8:
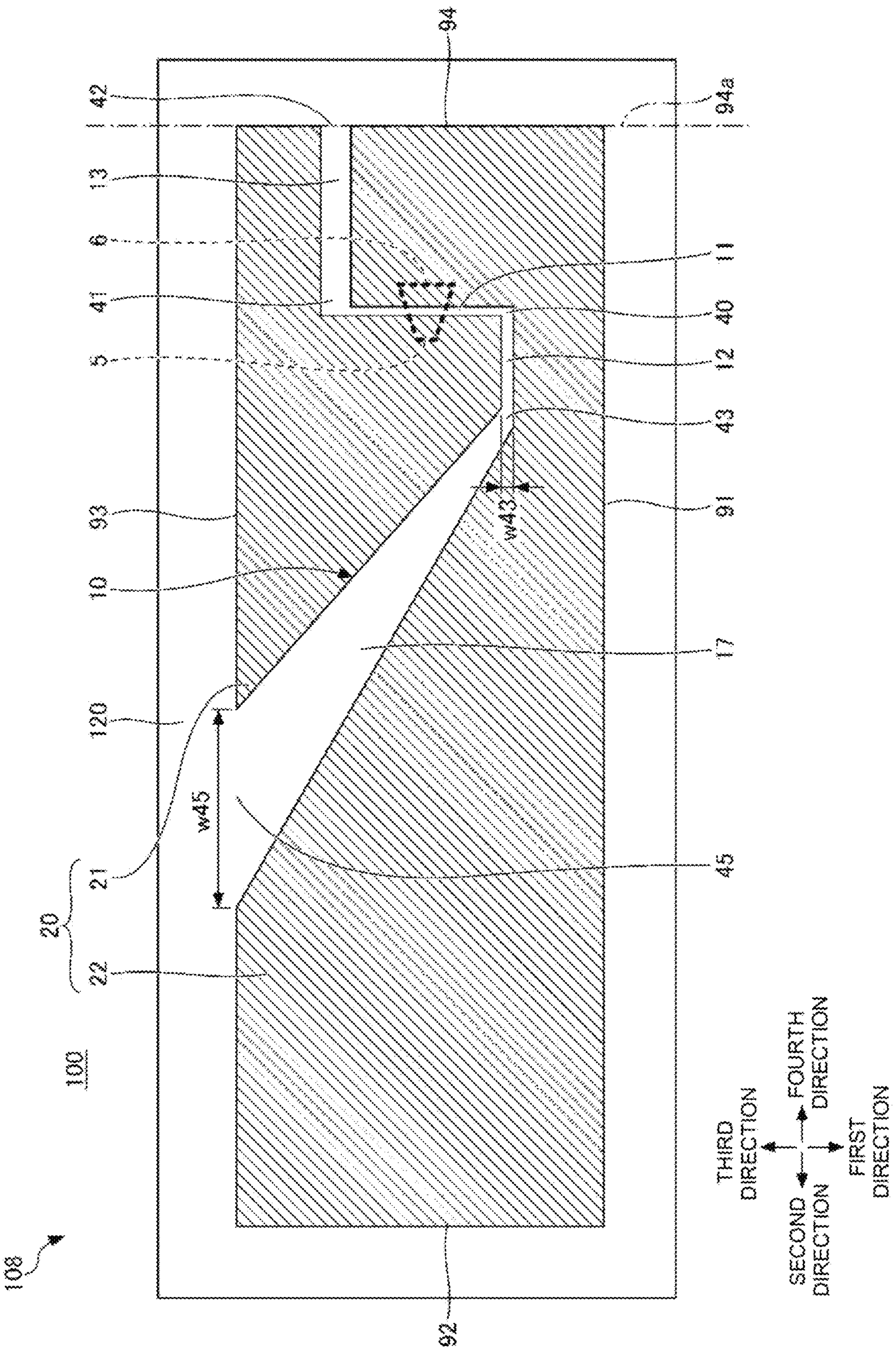
FIG. 8 is a plan view illustrating a configuration example of a planar antenna according to an eighth embodiment.

FIG. 8 is a plan view illustrating a configuration example of a planar antenna according to the eighth embodiment. The descriptions of the configuration and effect similar to those of the above-described embodiments will be omitted by incorporating the above descriptions. In a planar antenna 108 illustrated in FIG. 8, the slot 17 extends in the third direction while its slot width gradually increases toward the open end 45. For example, the slot 17 may include a portion that extends in the third direction while the slot width of the portion gradually increases or gradually decreases toward the open end 45.

Figure 9:
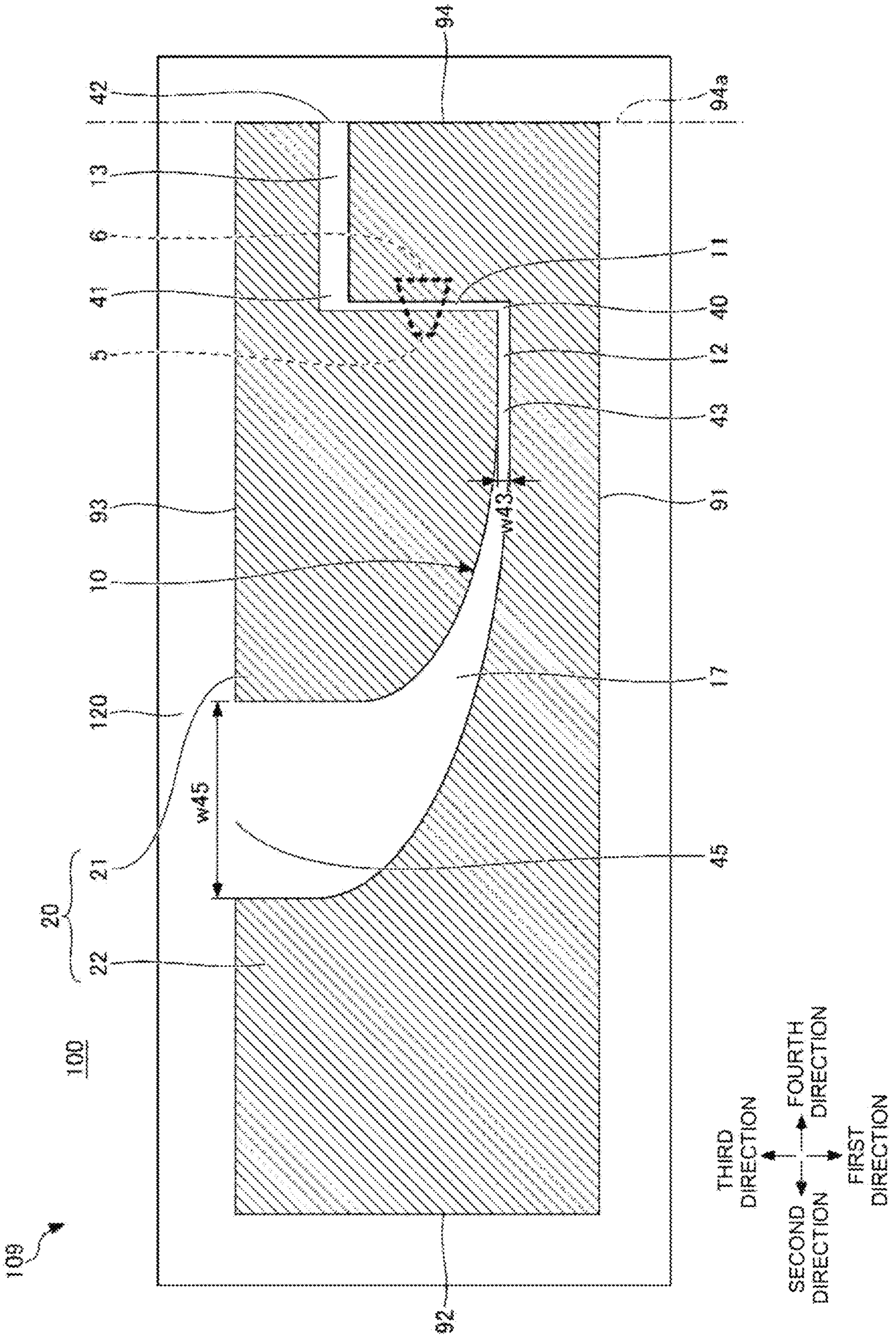
FIG. 9 is a plan view illustrating a configuration example of a planar antenna according to a ninth embodiment.

FIG. 9 is a plan view illustrating a configuration example of a planar antenna according to the ninth embodiment. The descriptions of the configuration and effect similar to those of the above-described embodiments will be omitted by incorporating the above descriptions. In a planar antenna 109 illustrated in FIG. 9, the slot 17 has a curved outline. By the slot 17 having the curved outline, a frequency band over which the planar antenna 109 can perform transmission and reception operations can be widened.

The slot 17 may include a portion where a slot width gradually increases. As a result, the frequency band over which the planar antenna 109 can perform the transmission and reception operations can be widened. As illustrated in FIG. 9, the slot 17 may include a portion that extends from the end portion 43 of the slot 12 in the second direction while the slot width of the portion gradually increases and then extends in the third direction while maintaining an approximately uniform slot width.

The slot 17 may have an outline resembling ¼ or less of an ellipse with a long axis approximately parallel to the second direction (in the case illustrated in FIG. 9, an outline resembling ¼ or less of such an ellipse). In this case, the outline of the slot 17 has a smooth curve, so that the frequency band over which the planar antenna 109 can perform the transmission and reception operations can be widened. The slot 17 may have another curved outline such as an outline resembling ¼ or less of a circle or ellipse. In particular, the planar antenna 109 illustrated in FIG. 9 is an example in which the slot width gradually increases until the extending direction of the slot 17 becomes parallel to the third direction and in which the slot width is approximately uniform in a portion that extends parallel to the third direction.

Figure 10:
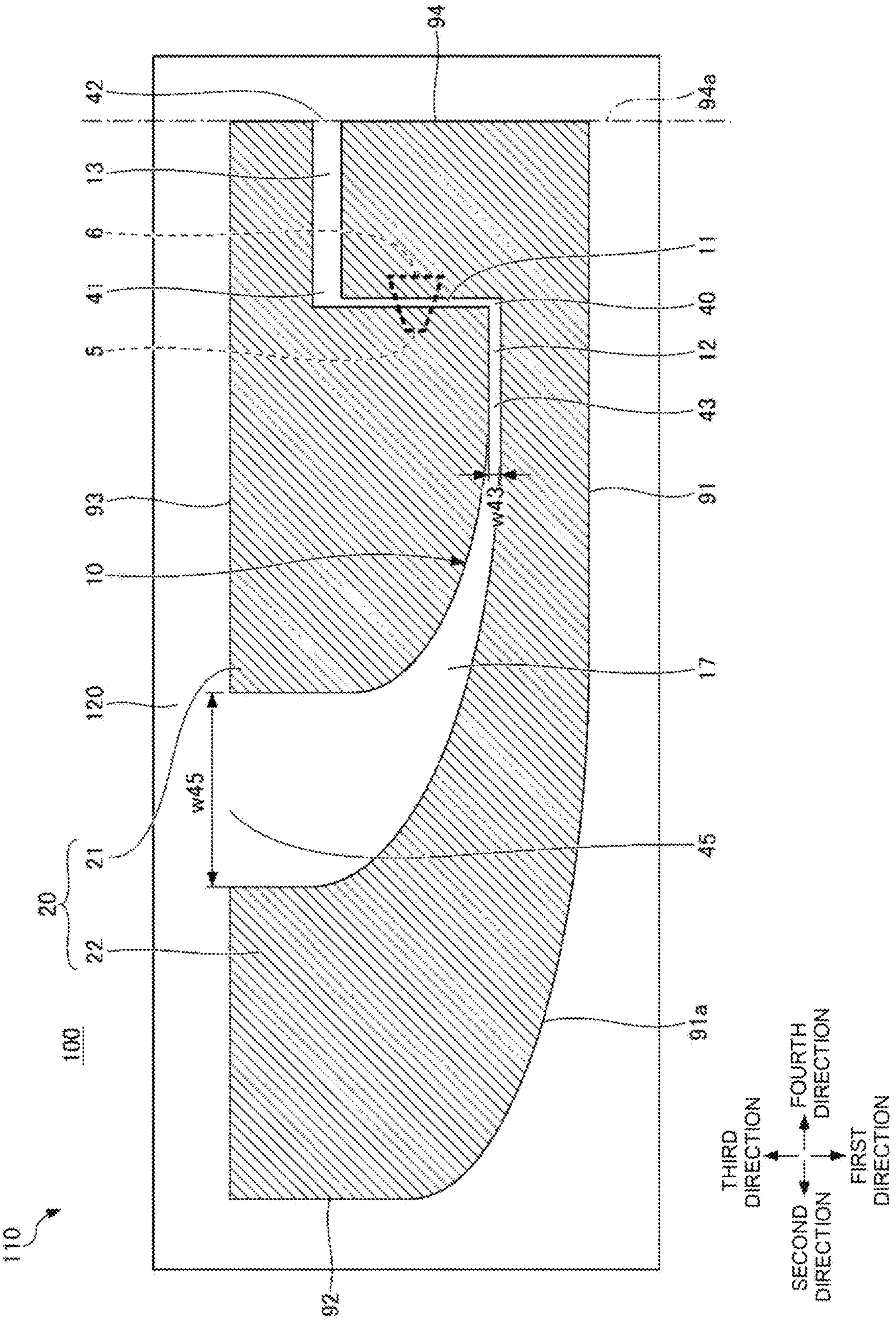
FIG. 10 is a plan view illustrating a configuration example of a planar antenna according to a tenth embodiment.

FIG. 10 is a plan view illustrating a configuration example of a planar antenna according to the tenth embodiment. The descriptions of the configuration and effect similar to those of the above-described embodiments will be omitted by incorporating the above descriptions. In a planar antenna 110 illustrated in FIG. 10, the outer edge 91 opposite to the outer edge 93 includes a curved portion 91*a*. By the outer edge 91 including the curved portion 91*a*, the impedance matching in the frequency band of 750 MHz to 1 GHz is facilitated. In addition, the amount of the second conductor 22 used can be reduced, and this improves the productivity. In the tenth embodiment, the curved portion 91*a*, which is an end portion of the outer edge 91, has an outline resembling ¼ of an ellipse with a long axis approximately parallel to the second direction. However, the curved portion 91*a* may have another curved outline such as an outline resembling ¼ or less of a circle or ellipse.

Figure 28:
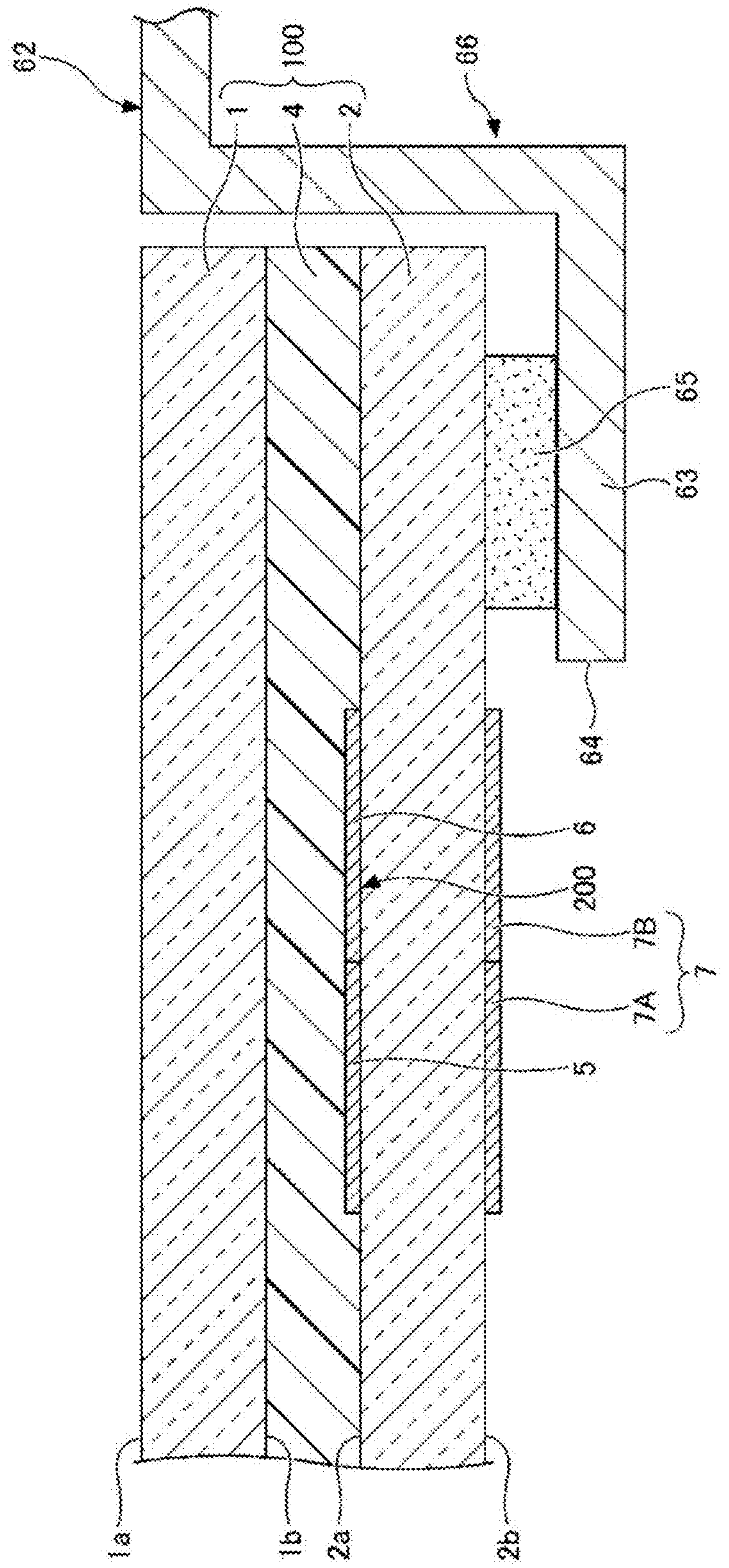
FIG. 28 is a sectional view illustrating a configuration example of a planar antenna according to an eleventh embodiment.

FIG. 28 is a sectional view illustrating a configuration example of a planar antenna according to the eleventh embodiment. The descriptions of the configuration and effect similar to those of the above-described embodiments will be omitted by incorporating the above descriptions. A planar antenna 200 illustrated in FIG. 28 is enclosed in the window glass 100. The planar antenna 200 may be any one of the planar antennas 101 to 110 of the above-described embodiments.

The window glass 100 is attached to a window frame 66 formed at a vehicle body 62. The window glass 100 is attached to the window frame 66 by, for example, bonding a peripheral edge portion of a main surface 2*b* of the window glass 100 and the window frame 66, which is flange-shaped, to each other with an adhesive 65 such as a urethane resin. The window frame 66 includes a metal portion 63 that faces at least a portion of the peripheral edge portion of the main surface 2*b* when the window glass 100 is viewed in a plan view. An inner edge 64 of the metal portion 63 forms an opening covered with the window glass 100 when the window glass 100 is viewed in a plan view.

In the case illustrated in FIG. 28, the window glass 100 is a laminated glass in which a glass plate 1 disposed on a vehicle-exterior side and a glass plate 2 disposed on a vehicle-interior side are bonded to each other with an interlayer 4 interposed therebetween. The interlayer 4 is disposed so as to be sandwiched between the glass plate 1 and the glass plate 2.

The glass plate 1 and the glass plate 2 are each a transparent plate-shaped dielectric. Either or both of the glass plate 1 and the glass plate 2 may be translucent. The glass plate 1 is an example of a first glass plate. The glass plate 2 is an example of a second glass plate that faces the first glass plate.

The glass plate 1 has a main surface 1*a* and a main surface 1*b* opposite to the main surface 1*a*. The main surface 1*a* corresponds to a surface on the vehicle-exterior side, and the main surface 1*b* corresponds to a surface on the vehicle-interior side.

The glass plate 2 has a main surface 2*a* that faces the main surface 1*b* of the glass plate 1 and the main surface 2*b* opposite to the main surface 2*a*. The main surface 2*a* corresponds to a surface on the vehicle-exterior side, and the main surface 2*b* corresponds to a surface on the vehicle-interior side. The main surface 2*b* is a surface opposite to the interlayer 4 of the glass plate 1.

The interlayer 4 has a dielectric property and is a transparent or translucent dielectric interposed between the glass plate 1 and the glass plate 2. The glass plate 1 and the glass plate 2 are bonded to each other by the interlayer 4. Examples of a material of the interlayer 4 include thermoplastic polyvinyl butyral (PVB), ethylene-vinyl acetate (EVA) copolymer, cycloolefin polymer (COP), and polyurethane.

The planar antenna 200 is formed on the main surface 2*a* of the glass plate 2. However, the planar antenna 200 may be formed on the main surface 1*b* of the glass plate 1 or may be disposed between a plurality of interlayers 4.

In the planar antenna 200, the first feeding point 5 and the second feeding point 6 are electrically connected to an electrode 7 which they face with the glass plate 2 interposed therebetween, through capacitive coupling by the glass plate 2. The electrode 7 includes an electrode 7A that faces the first feeding point 5 and an electrode 7B that faces the second feeding point 6, and is a planar conductor formed on the main surface 2*b* of the glass plate 2. The electrode 7A facing the first feeding point 5 is electrically connected to a signal line of a transmission line (not shown) such as a coaxial cable, and the electrode 7B facing the second feeding point 6 is electrically connected to a ground line of the transmission line (not shown) such as a coaxial cable.

Simulation results of the antennas of the embodiments will now be described.

FIG. 11 to FIG. 20 are diagrams illustrating examples of simulation results of the planar antennas of the first to tenth embodiments, respectively. The VSWR is an abbreviation for "voltage standing wave ratio". The VSWR is preferably 3.5 or less, and the closer it is to 1, the better the impedance matching. Note that the frequencies used vary by region or country, and in this example, a frequency band of 1 GHz or higher to 1.7 GHZ or lower within the range of 600 MHz to 6 GHz is set to be a frequency band not to be used. The VSWR in such a frequency band not to be used may exceed, for example, 3.5. Note that the indices in the above simulation results can also be applied to FIG. 29 and FIG. 31.

Figure 11:
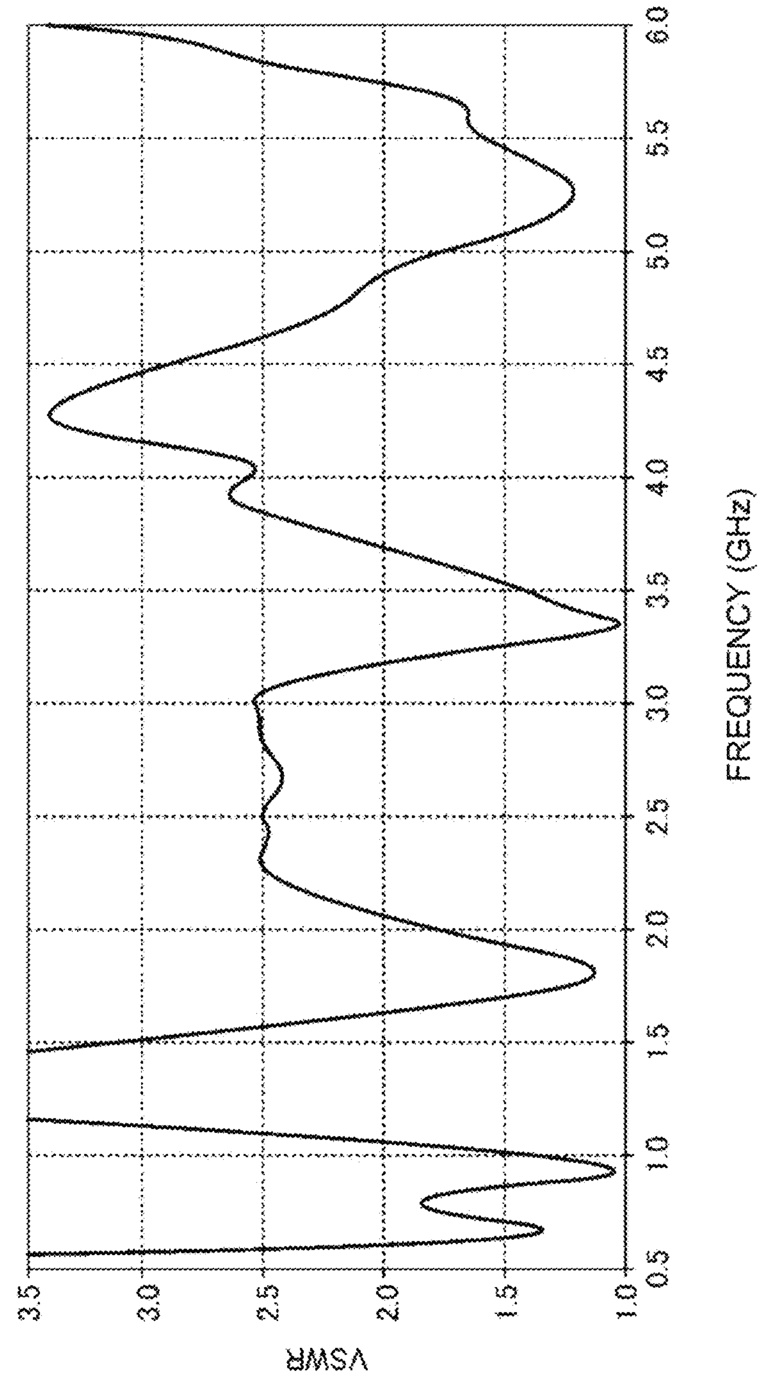
FIG. 11 is a graph illustrating an example of a simulation result of the planar antenna of the first embodiment.

In the case of the planar antenna 101 (FIG. 1), according to FIG. 11, the VSWR is 3.5 or less in a 1.7 GHZ to 6 GHz band, and thus, impedance matching was performed also in a relatively high frequency band up to about 6 GHZ.

Figure 12:
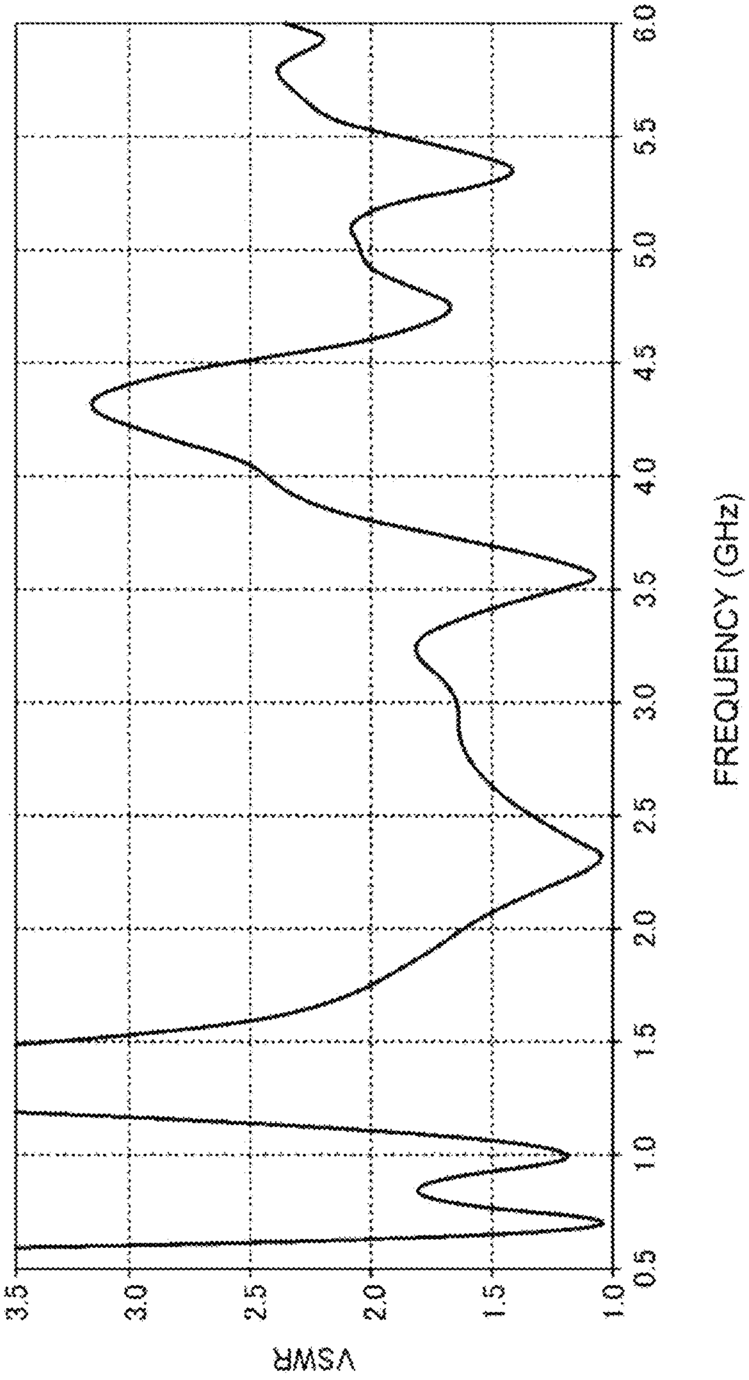
FIG. 12 is a graph illustrating an example of a simulation result of the planar antenna of the second embodiment.

In the case of the planar antenna 102 (FIG. 2), according to FIG. 12, the VSWR was particularly improved in the vicinity of 2.2 GHZ to 3.2 GHZ and in the vicinity of 4.7 GHz compared with the case of the planar antenna 101 (FIG. 1) illustrated in FIG. 11.

Figure 13:
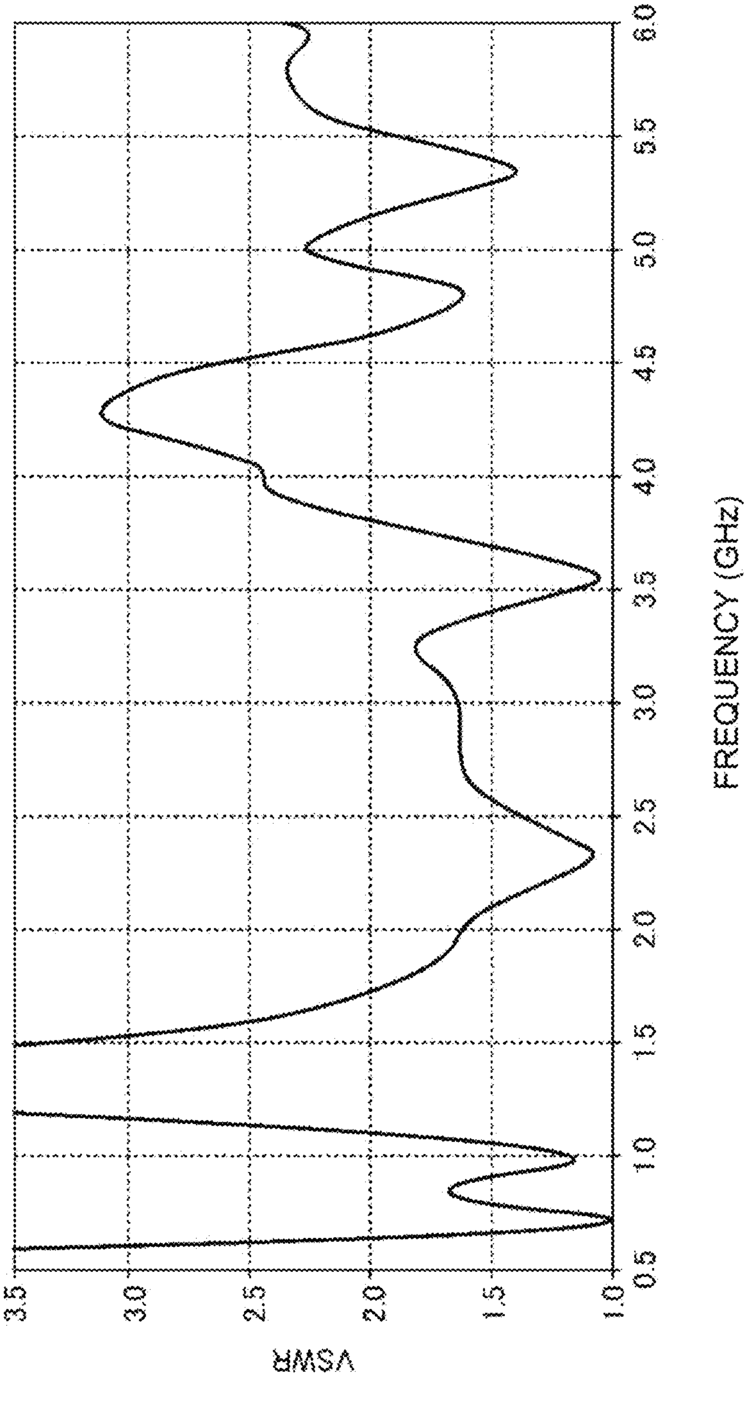
FIG. 13 is a graph illustrating an example of a simulation result of the planar antenna of the third embodiment.

In the case of the planar antenna 103 (FIG. 3), according to FIG. 13, the VSWR was particularly improved in the vicinity of 800 MHZ and in the vicinity of 5 GHZ compared with the case of the planar antenna 102 (FIG. 2) illustrated in FIG. 12.

Figure 14:
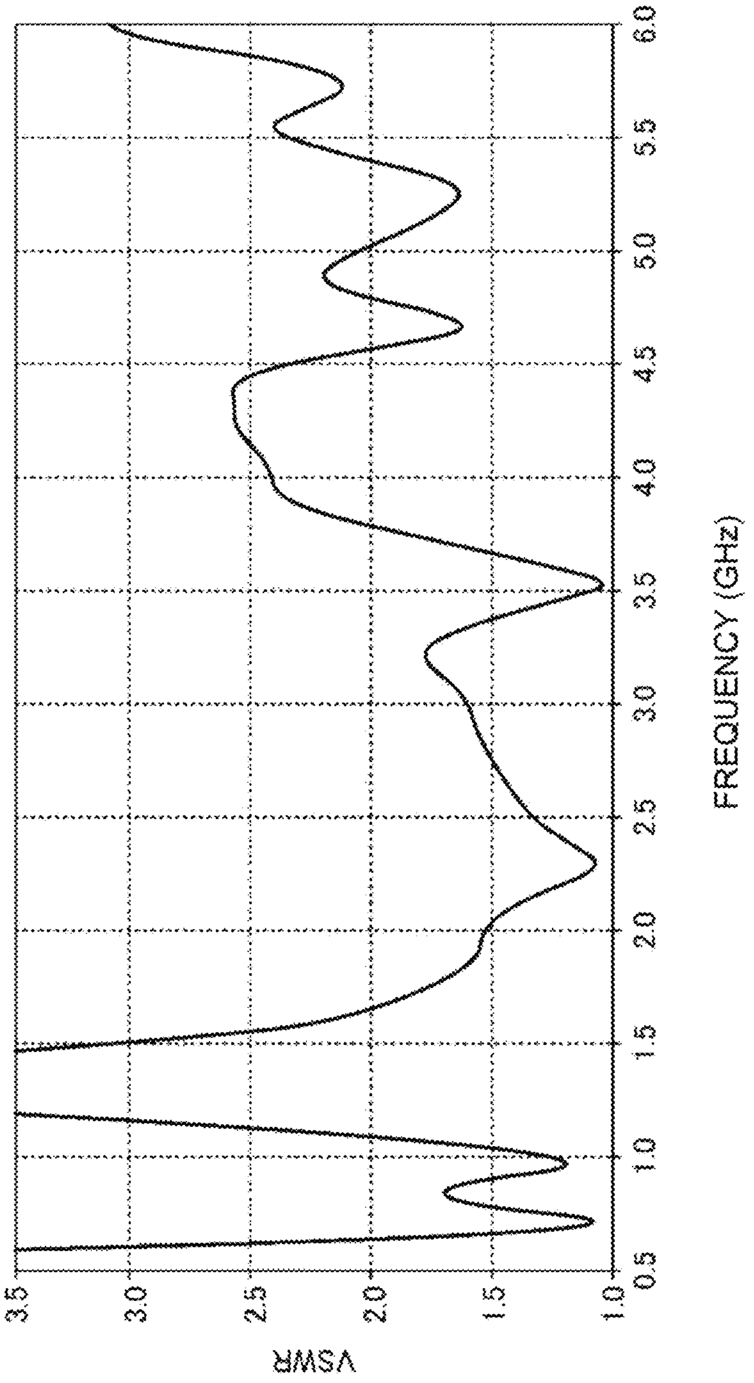
FIG. 14 is a graph illustrating an example of a simulation result of the planar antenna of the fourth embodiment.

In the case of the planar antenna 104 (FIG. 4), according to FIG. 14, the VSWR was particularly improved in the vicinity of 4.3 GHZ compared with the case of the planar antenna 103 (FIG. 3) illustrated in FIG. 13.

Figure 15:
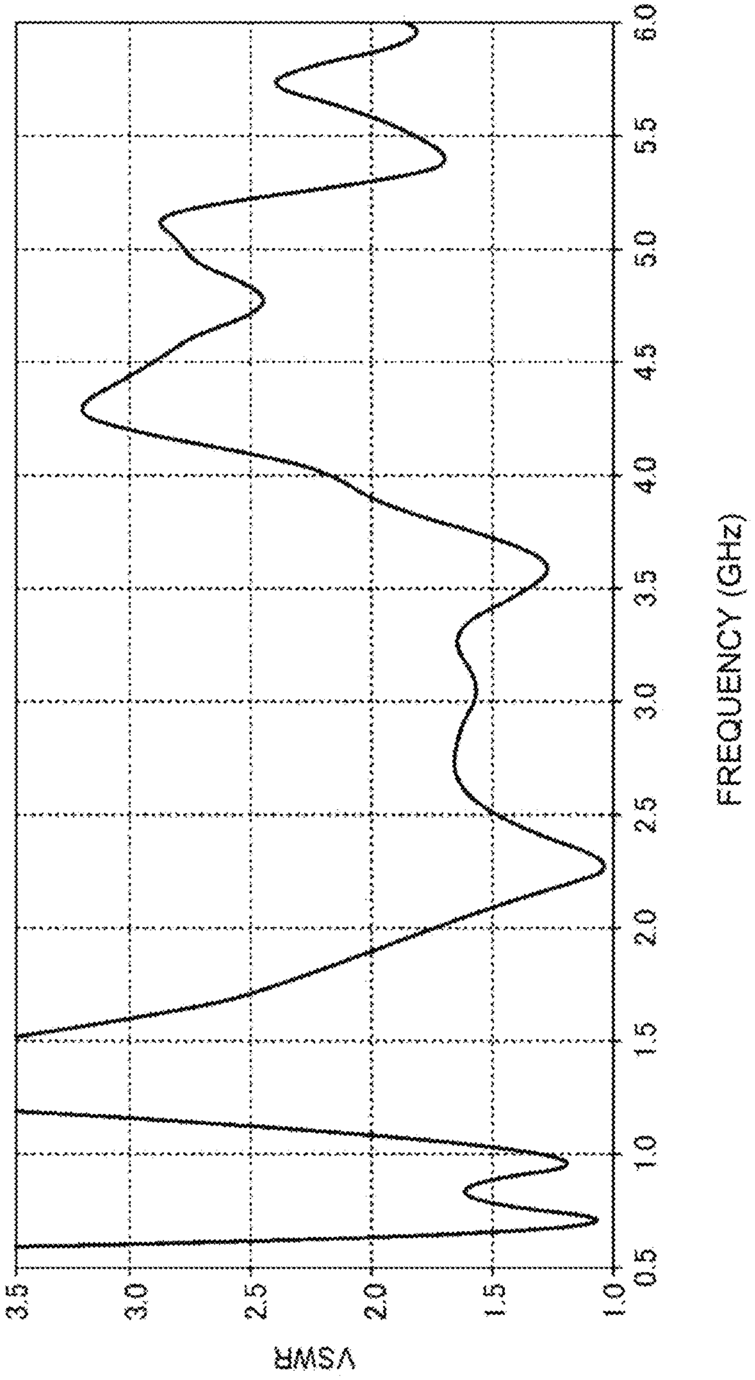
FIG. 15 is a graph illustrating an example of a simulation result of the planar antenna of the fifth embodiment.

In the case of the planar antenna 105 (FIG. 5), according to FIG. 15, the VSWR was particularly improved in the vicinity of 800 MHZ compared with the case of the planar antenna 102 (FIG. 2) illustrated in FIG. 12.

Figure 16:
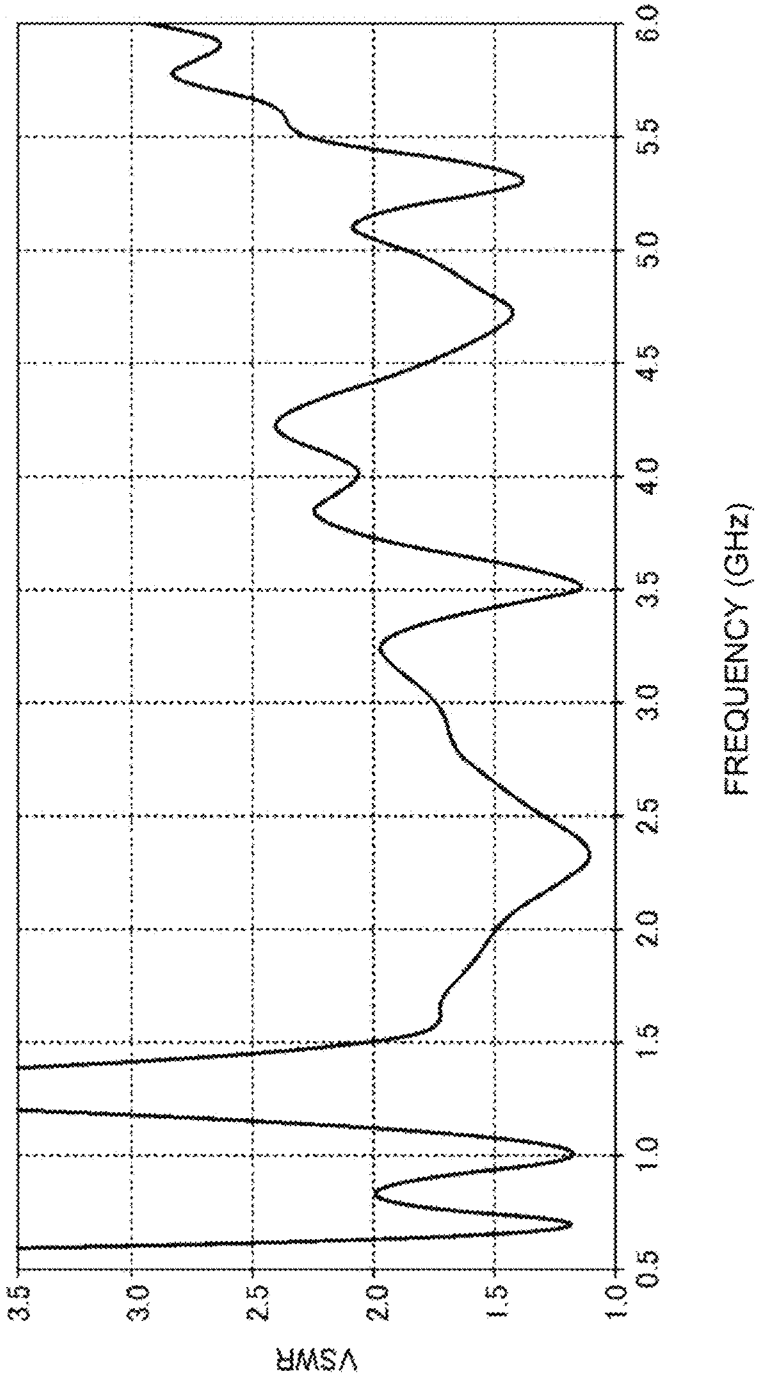
FIG. 16 is a graph illustrating an example of a simulation result of the planar antenna of the sixth embodiment.

In the case of the planar antenna 106 (FIG. 6), according to FIG. 16, the VSWR was particularly improved in a 4 GHz to 4.5 GHz band compared with the case of the planar antenna 102 (FIG. 2) illustrated in FIG. 12.

Figure 17:
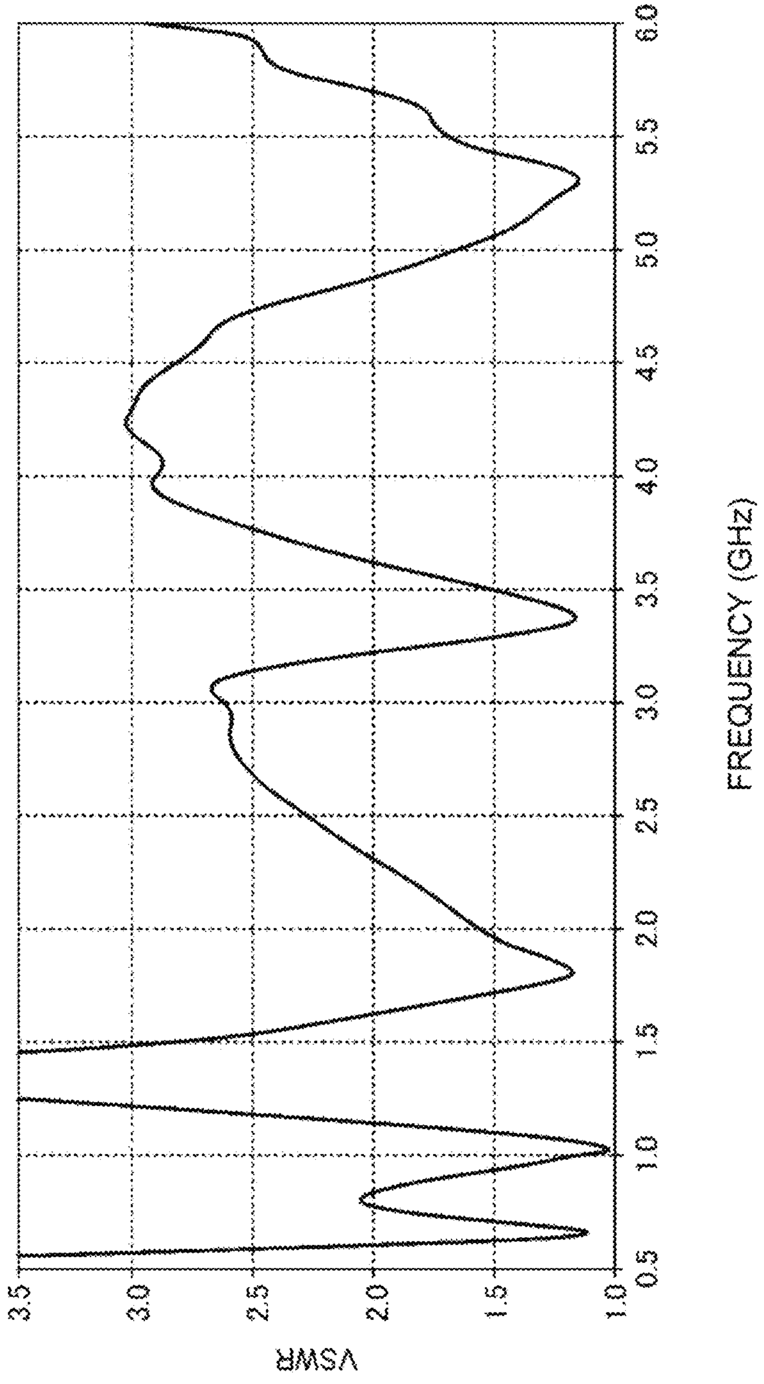
FIG. 17 is a graph illustrating an example of a simulation result of the planar antenna of the seventh embodiment.

In the case of the planar antenna 107 (FIG. 7), according to FIG. 17, the VSWR was particularly improved in the vicinity of 4.3 GHZ and in the vicinity of 5.9 GHZ compared with the case of the planar antenna 101 (FIG. 1) illustrated in FIG. 11.

Figure 18:
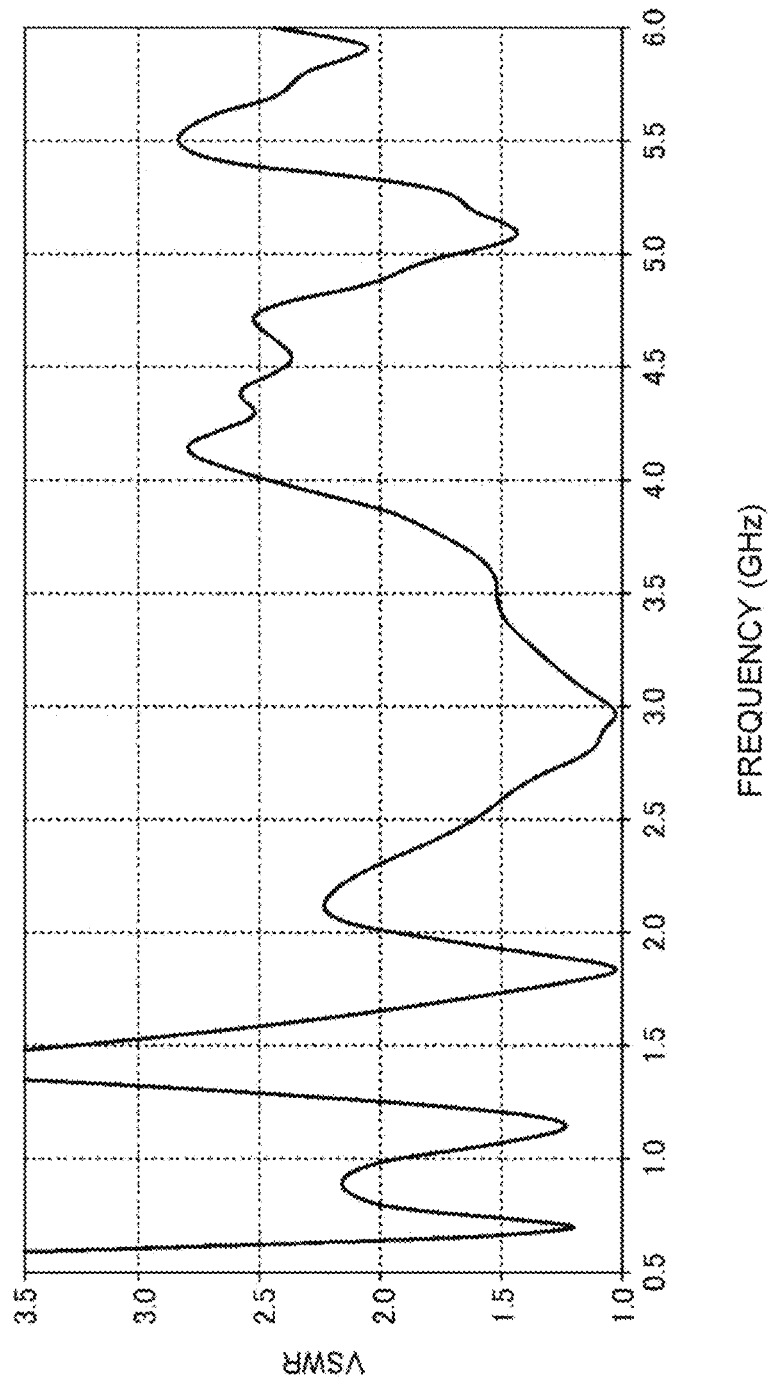
FIG. 18 is a graph illustrating an example of a simulation result of the planar antenna of the eighth embodiment.

In the case of the planar antenna 108 (FIG. 8), according to FIG. 18, the VSWR was particularly improved in the vicinity of 3 GHZ, in a 4.2 GHz to 4.5 GHz band, and in a 5.8 GHz to 6.0 GHz band compared with the case of the planar antenna 101 (FIG. 1) illustrated in FIG. 11.

Figure 19:
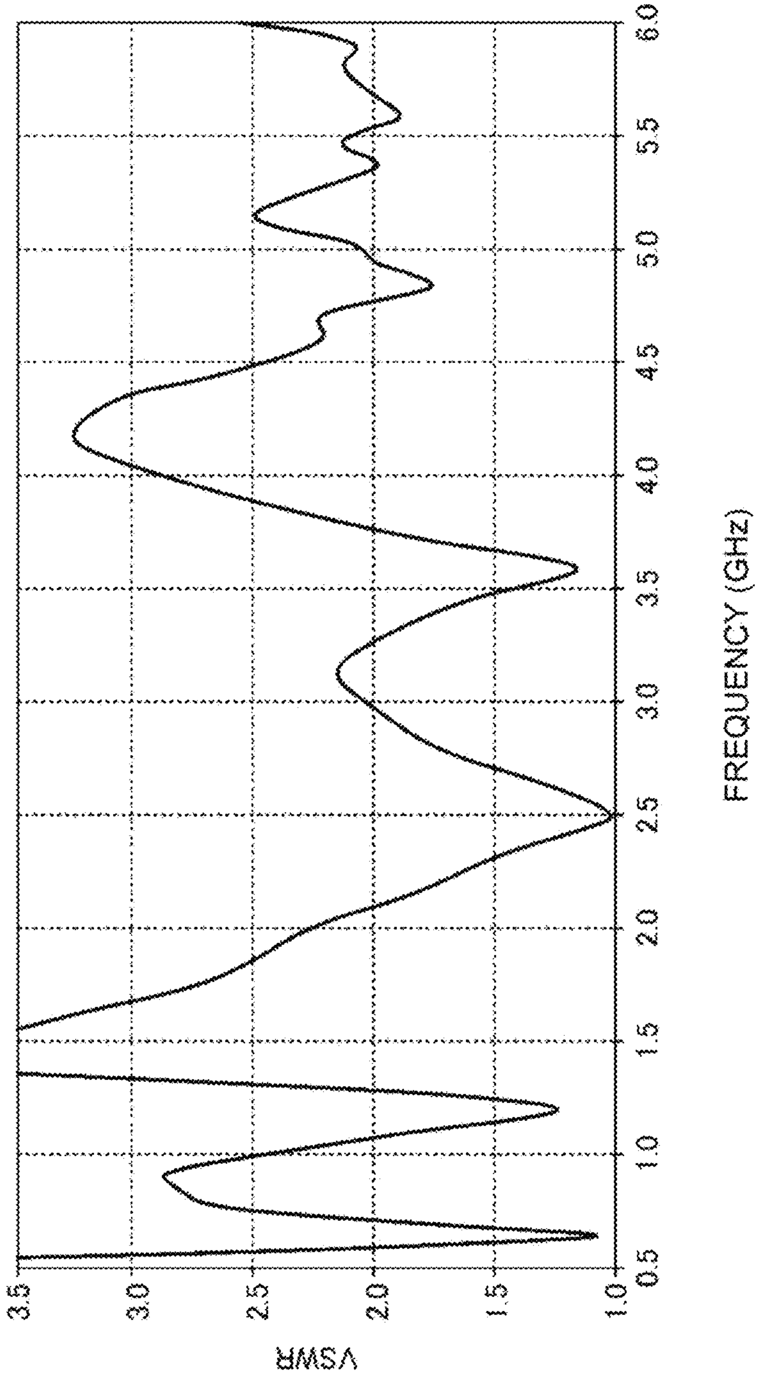
FIG. 19 is a graph illustrating an example of a simulation result of the planar antenna of the ninth embodiment.

In the case of the planar antenna 109 (FIG. 9), according to FIG. 19, the VSWR was particularly improved in the vicinity of 2.5 GHZ and in the 5.8 GHz to 6.0 GHZ band compared with the case of the planar antenna 101 (FIG. 1) illustrated in FIG. 11.

Figure 20:
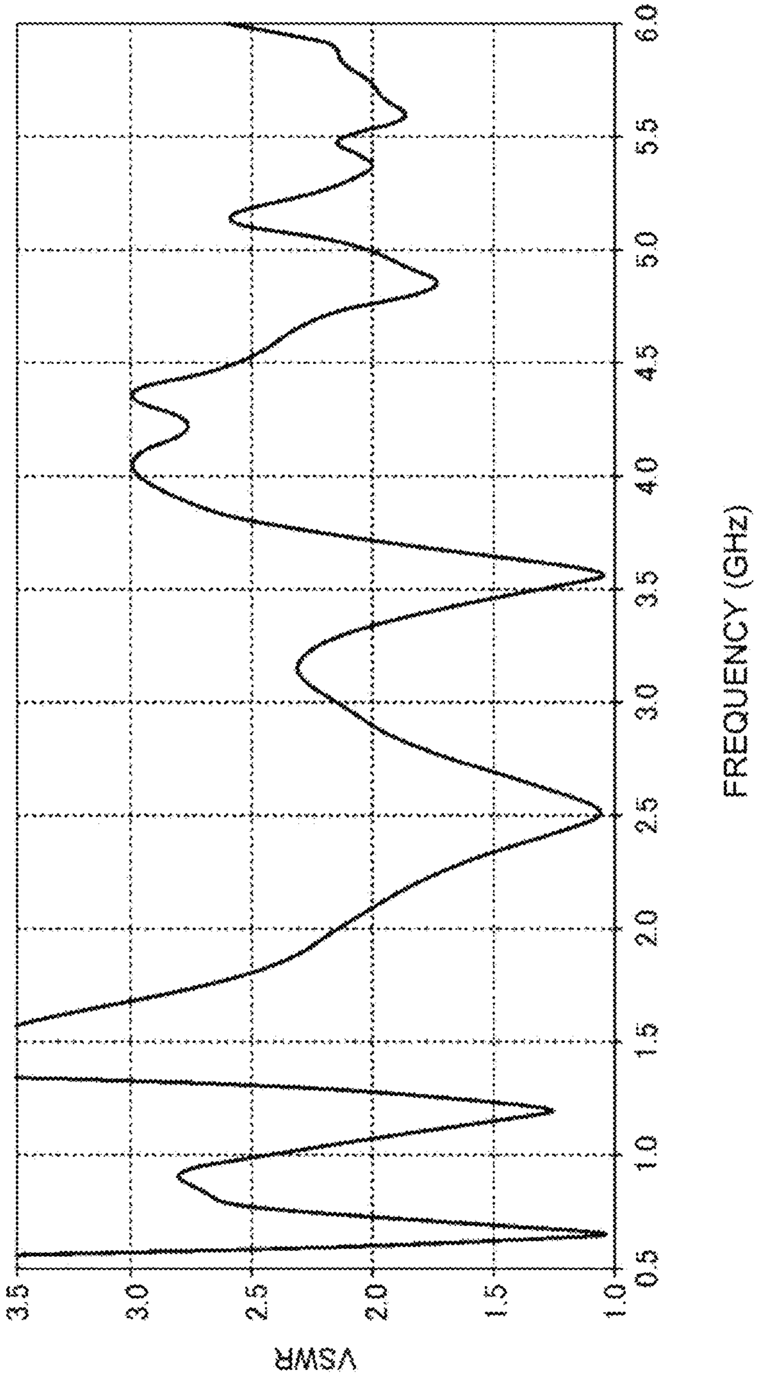
FIG. 20 is a graph illustrating an example of a simulation result of the planar antenna of the tenth embodiment.

In the case of the planar antenna 110 (FIG. 10), according to FIG. 20, the VSWR was particularly improved in a 4.1 GHZ to 4.4 GHz band compared with the case of the planar antenna 109 (FIG. 9) illustrated in FIG. 19.

Figure 21:
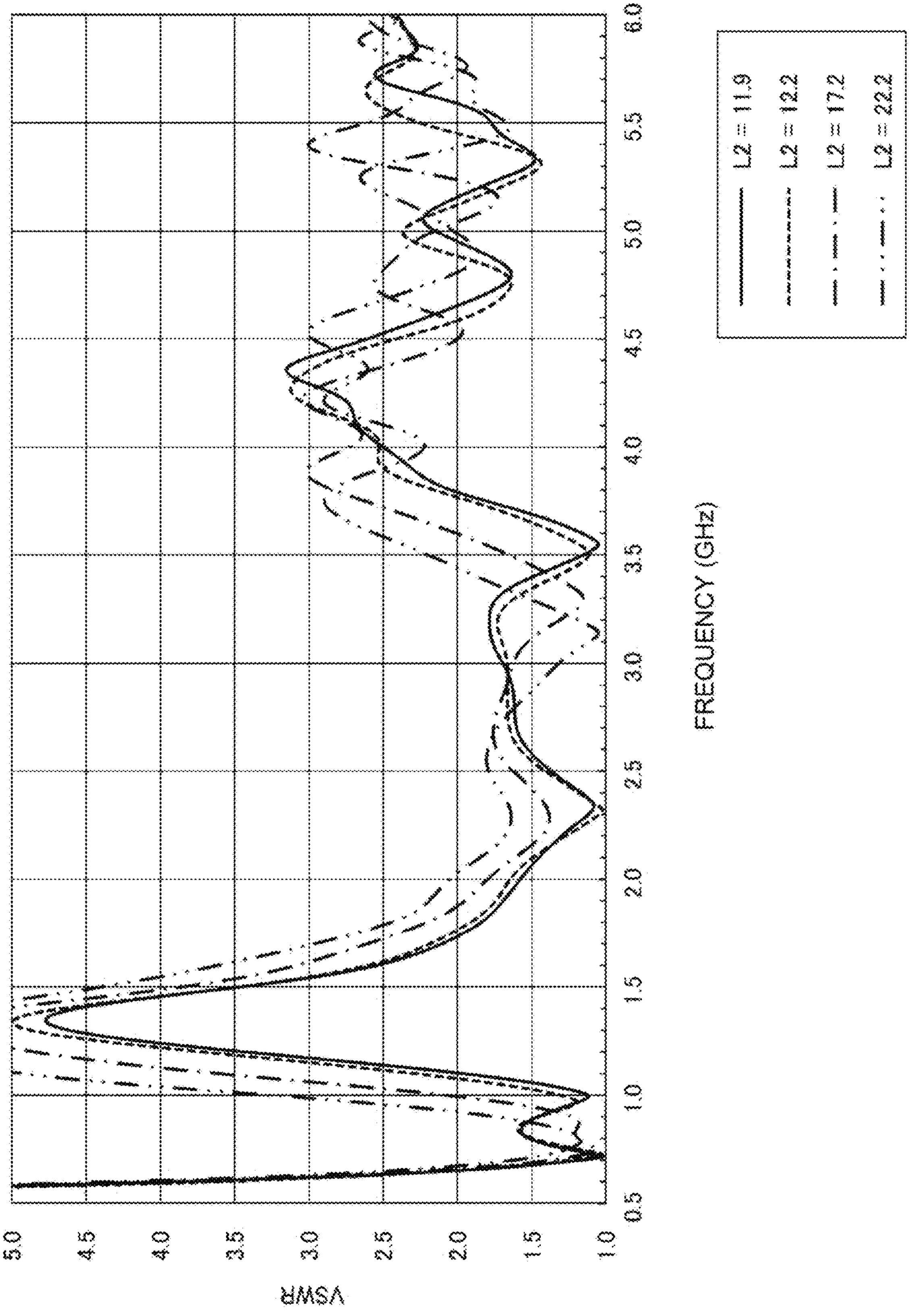
FIG. 21 is a graph illustrating an example of a simulation result of the planar antenna when a slot length L2 of a second slot is changed.

FIG. 21 is a graph illustrating an example of a simulation result of the planar antenna 103 (FIG. 3) of the third embodiment when the slot length L2 (in units of mm) of the slot 12 is changed in a state where a slot length L1 of the slot 11 is fixed to 21.7 mm. As illustrated in FIG. 21, the shorter the slot length L2, the higher the likelihood that the VSWR will approach 1 over the entire frequency range illustrated in FIG. 21, and impedance matching was easily performed.

Figure 22:
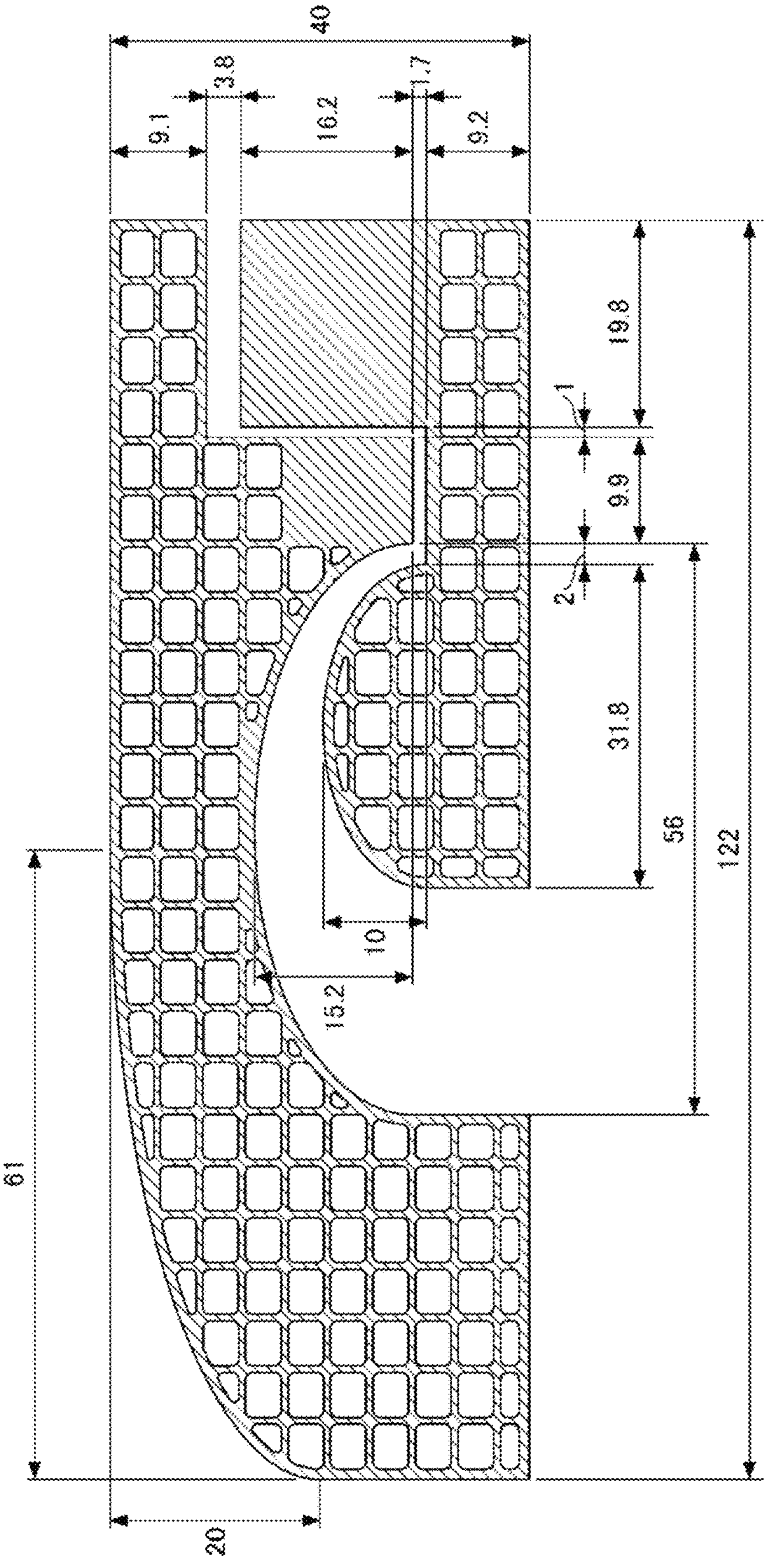
FIG. 22 is a diagram illustrating dimensions common to planar antennas in the respective simulations.
Figure 23:
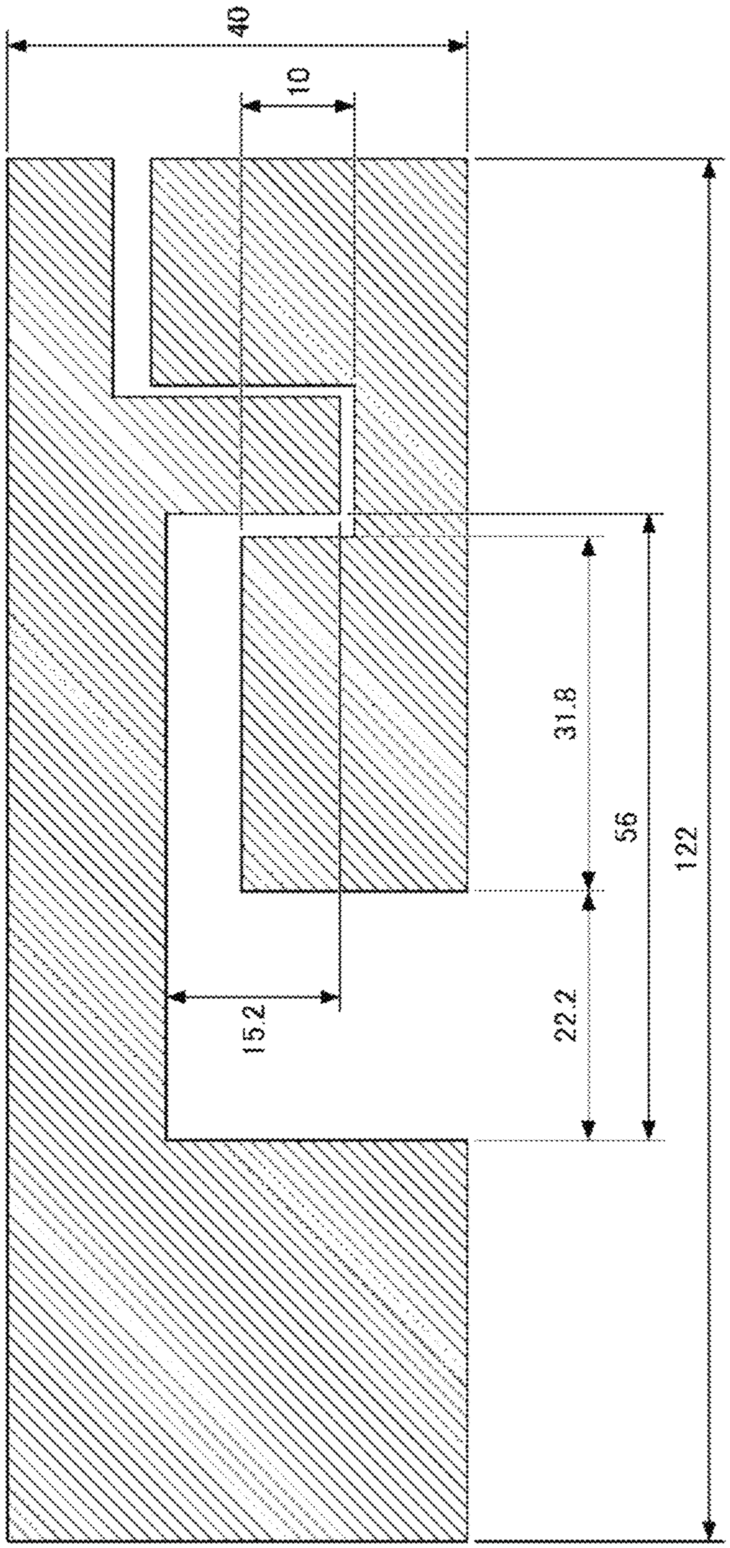
FIG. 23 is a diagram illustrating dimensions specific to planar antenna illustrated in FIG. 1 in a simulation.
Figure 24:
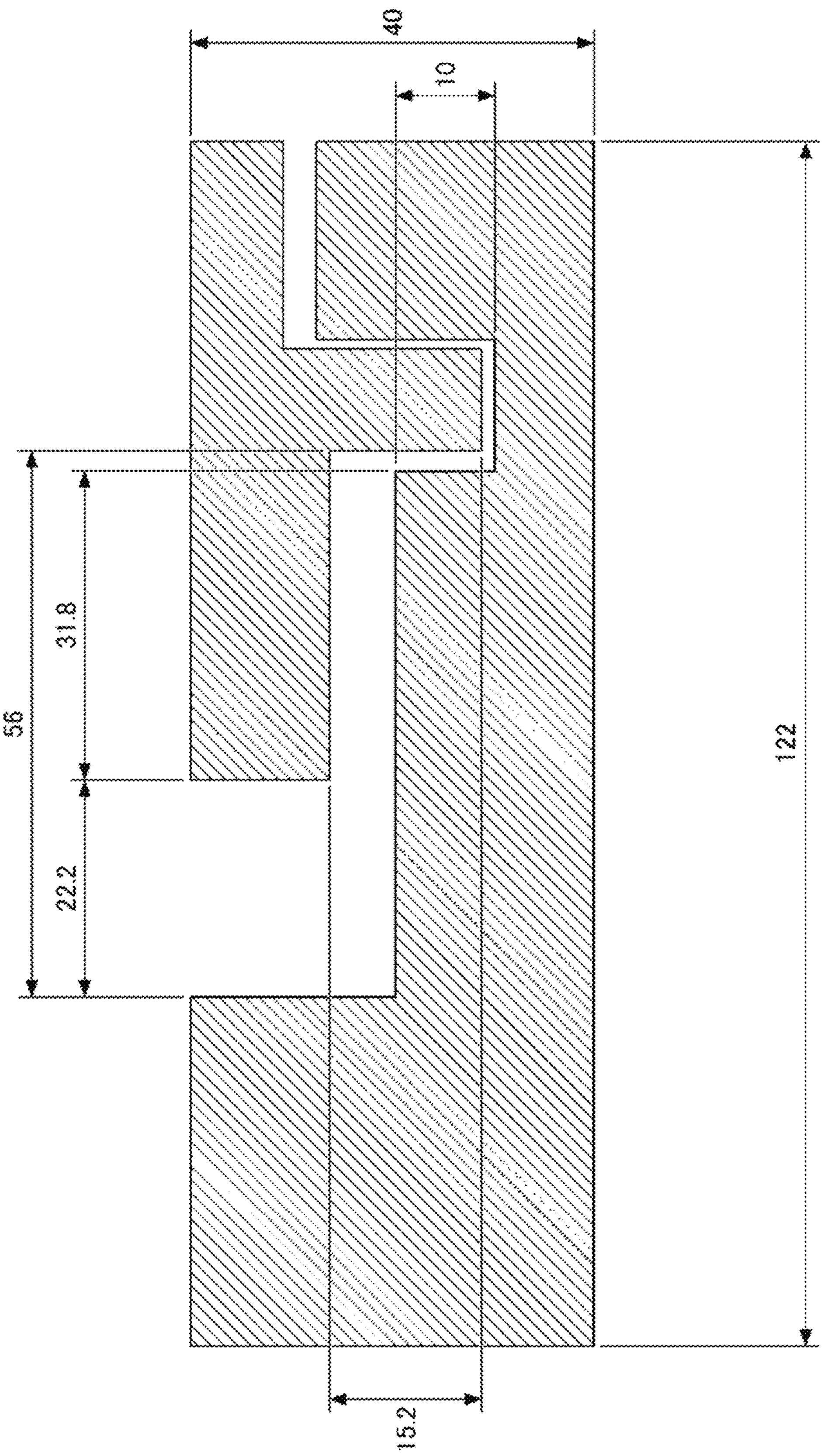
FIG. 24 is a diagram illustrating dimensions specific to planar antenna illustrated in FIG. 7 in a simulation.
Figure 25:
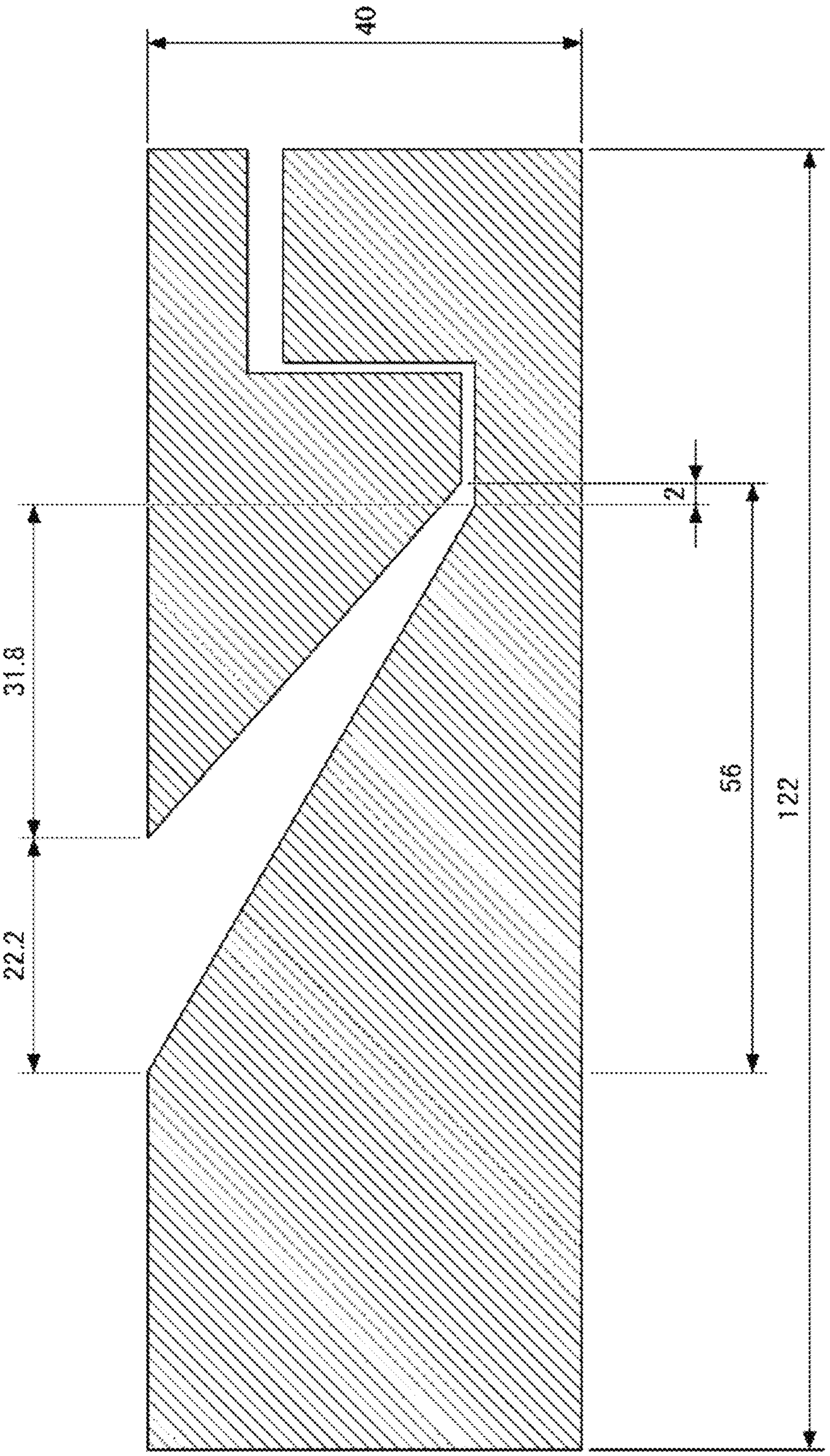
FIG. 25 is a diagram illustrating dimensions specific to planar antenna illustrated in FIG. 8 in a simulation.
Figure 26:
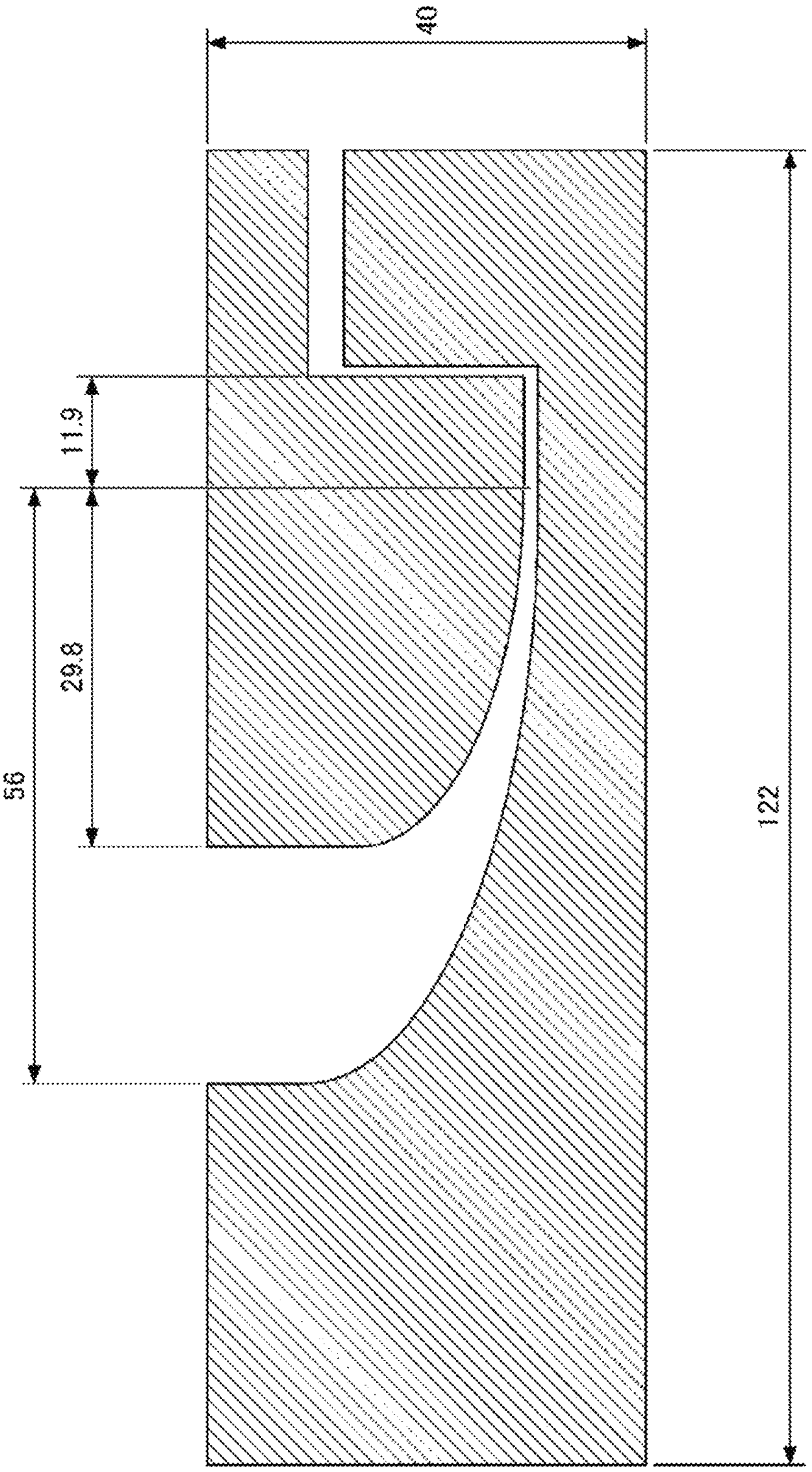
FIG. 26 is a diagram illustrating dimensions specific to planar antenna illustrated in FIG. 9 in a simulation.
Figure 27:
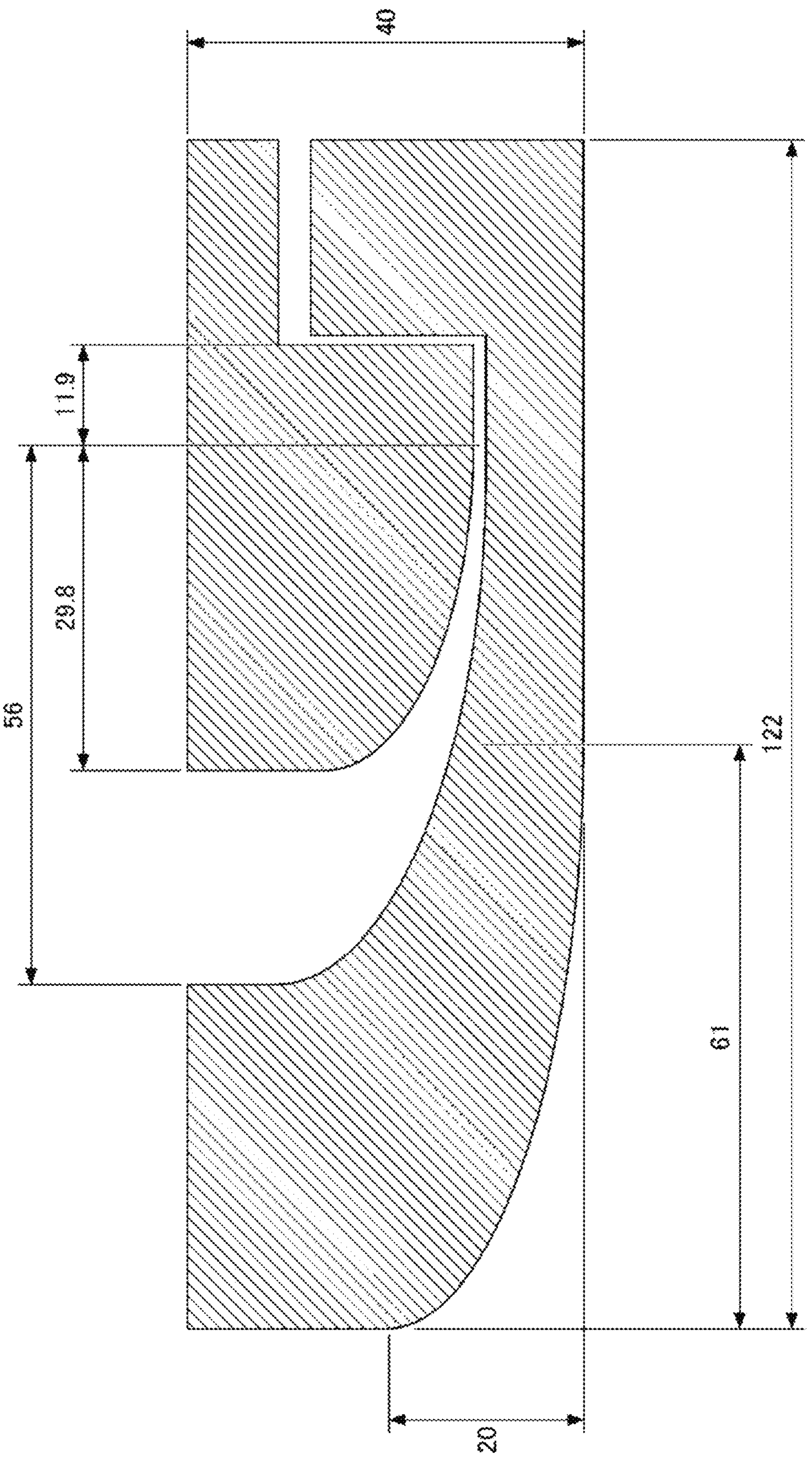
FIG. 27 is a diagram illustrating dimensions specific to planar antenna illustrated in FIG. 10 in a simulation.

Note that, in the simulations illustrated in FIG. 11 to FIG. 21, the dimensions common to the planar antennas were set to the values (in units of mm) illustrated in FIG. 22. The dimensions specific to planar antennas were set to the values (in units of mm) illustrated in FIG. 23 to FIG. 27.

Figure 29:
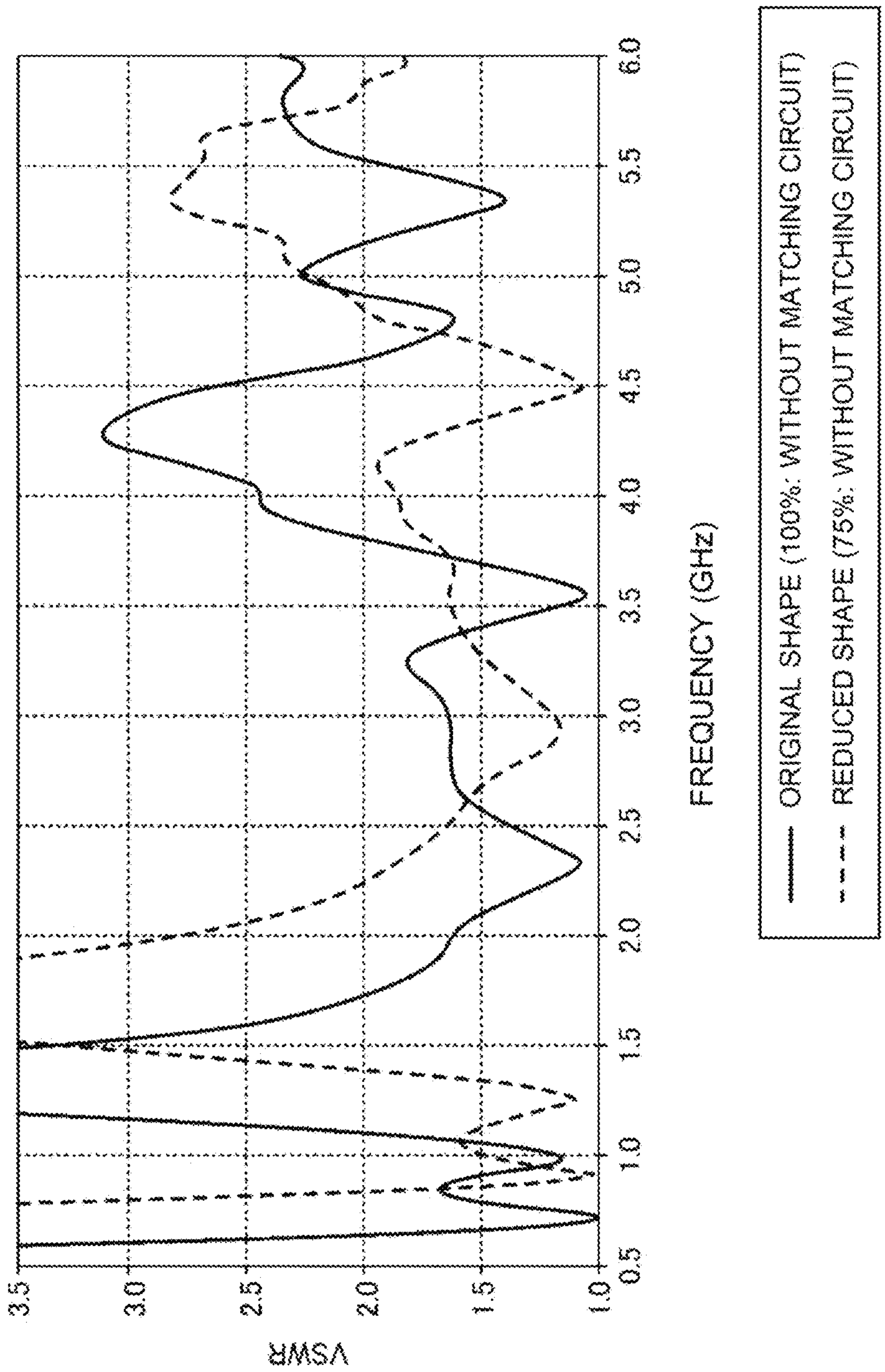
FIG. 29 is a graph illustrating an example of a simulation result of a planar antenna having an original shape (100%) and an example of a simulation result of a planar antenna having a shape obtained by reducing the original shape to 75%, the original shape being set to a shape of a planar antenna that supports a frequency band of 600 MHz to 6 GHz without a matching circuit.

FIG. 29 is a graph illustrating an example of a simulation result of a planar antenna having an original shape (100%) and an example of a simulation result of a planar antenna having a shape obtained by reducing the original shape to 75%, the original shape being set to a shape of a planar antenna that supports a frequency band of 600 MHz to 6 GHZ. FIG. 29 illustrates the case of the planar antenna 103 (FIG. 3) as an example.

In the case of the original shape, the VSWR is 3.5 or less in a 600 MHz to 1.2 GHz band and in a 1.5 GHz to 6 GHz band, and thus, a result was obtained in which impedance matching was performed also in a relatively high frequency band up to about 6 GHz. However, when the planar antenna 103 is reduced in size by a similarity ratio of 1:0.75, the VSWR waveform shifts to a high frequency range overall, so that a result was obtained in which a band appeared in which the VSWR exceeded 3.5 in a low-frequency band of 1.9 GHz or lower (excluding the above-mentioned frequency band not to be used). In other words, a result was obtained in which the antenna characteristics in the low-frequency band deteriorated.

Figure 30:
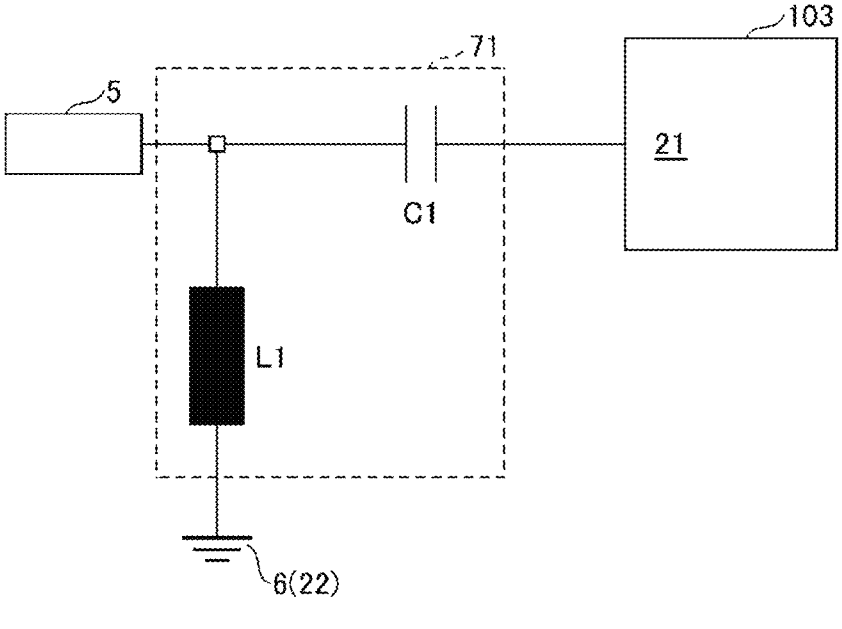
FIG. 30 is a diagram illustrating a matching circuit at the time of a simulation.
Figure 31:
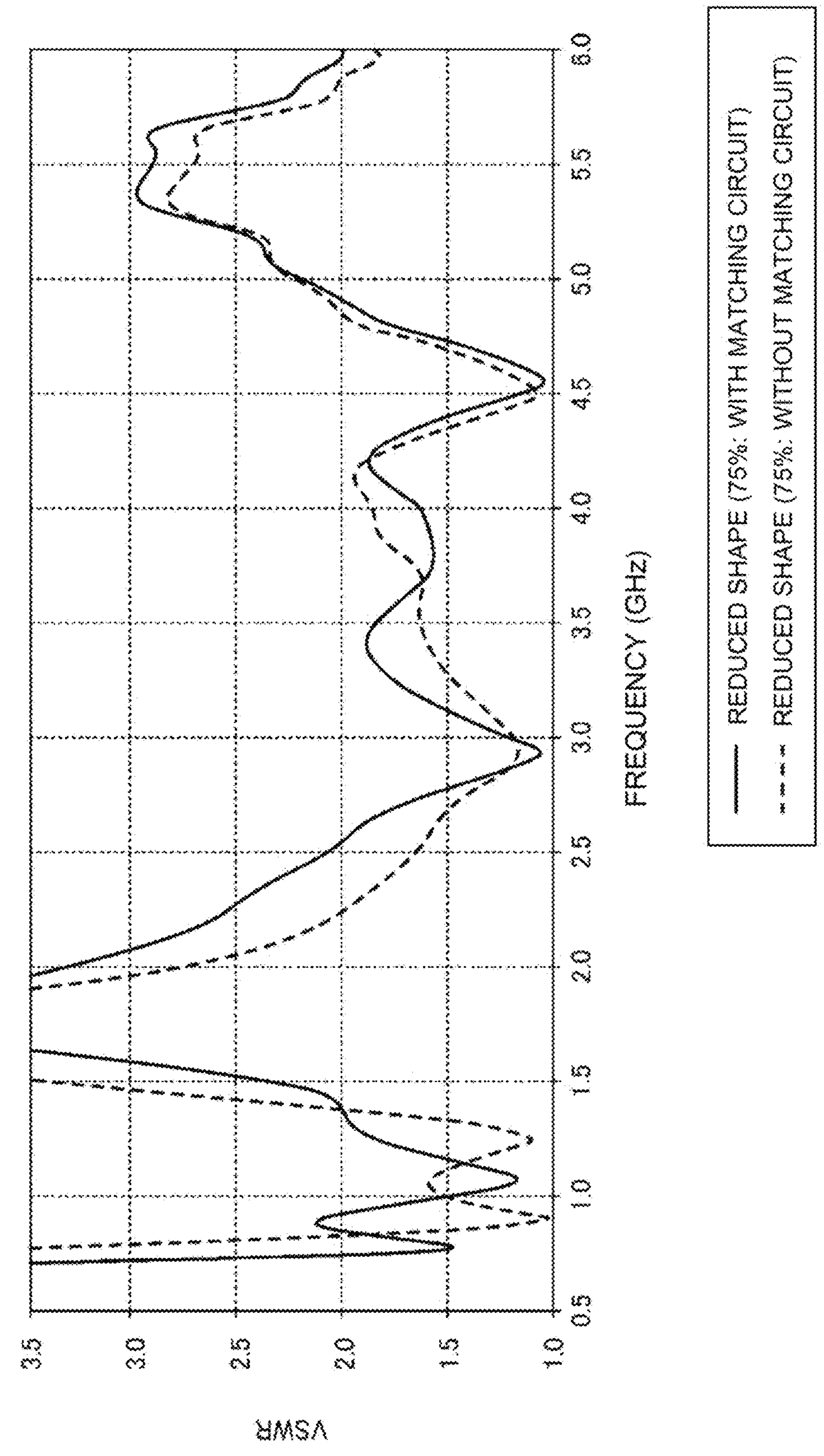
FIG. 31 is a graph illustrating an example of a simulation result of a planar antenna to which a matching circuit is added.

FIG. 30 is a diagram illustrating an example of a matching circuit at the time of a simulation. FIG. 31 is a graph illustrating an example of a simulation result in a case where a matching circuit 71 illustrated in FIG. 30 is added to the planar antenna 103 having a shape obtained by reducing the original shape to 75%. As illustrated in FIG. 31, by adding the matching circuit 71, a band in which the VSWR was 3.5 or less increased in the low-frequency band of 1.9 GHZ or lower. In this manner, by adding the matching circuit 71, a result was obtained in which both a reduction in the size of the planar antenna 103 and ensuring of the antenna characteristics are achieved.

Note that, in the simulations illustrated in FIG. 29 to FIG. 31, the conditions of the members are as follows.

<Planar Antenna with Original Shape (100%) (without Matching Circuit)>

Maximum external dimension of the conductor 20 in the first direction: 40.0 mm Maximum external dimension of the conductor 20 in the second direction: 122.0 mm <Planar Antenna with Shape Obtained by Reducing Original Shape to 75% (without Matching Circuit)>

Maximum external dimension of the conductor 20 in the first direction: 30.0 mm Maximum external dimension of the conductor 20 in the second direction: 91.5 mm <Planar Antenna with Shape Obtained by Reducing Original Shape to 75% (with Matching Circuit)>

Maximum external dimension of the conductor 20 in the first direction: 30.0 mm Maximum external dimension of the conductor 20 in the second direction: 91.5 mm <Matching Circuit 71>

Capacitor C1: 8.2 pF

Inductor L1: 8.2 nH

The matching circuit 71 is an example of a matching circuit that performs impedance matching between the conductor 20 (an antenna element pattern) and a transmission line (e.g., a coaxial cable having a signal line electrically connected to the first feeding point 5). By the matching circuit 71 being connected to the first feeding point 5 and the second feeding point 6, even when the area of the conductor 20 is reduced, deterioration in the antenna characteristics of the planar antennas according to the embodiments of the present disclosure can be suppressed. In other words, a reduction in the size of each of the planar antennas of the embodiments of the present disclosure and ensuring of the antenna characteristics are both achieved.

Although the embodiments have been described above, the technique of the present disclosure is not limited to the above-described embodiments. Various modifications and improvements such as combinations or substitutions with some or all of other embodiments can be made.

For example, the planar antenna may be part or all of a plurality of antennas included in a diversity antenna or a multiple-input and multiple-output (MIMO) antenna. In this case, the communication quality is improved.

REFERENCE SYMBOLS

1 glass plate
2 glass plate
4 interlayer
5 first feeding point
6 second feeding point
7 electrode
10 to 17 slot
20 conductor
21 first conductor
22 second conductor
23 punched portion
24 punched portion
30 J-shaped slot
40, 41, 43 end portion
42, 44, 45 open end
50 J-shaped slot
62 vehicle body
63 metal portion
64 inner edge
65 adhesive
66 window frame
71 matching circuit
91, 92, 93, 94 outer edge
91*a*, 93*a* curved portion
94*a* imaginary line
100 window glass
101 to 110 planar antenna
120 dielectric layer
200 planar antenna

What is claimed is:

1. A planar antenna comprising:
a slot formed in a flat conductor,
wherein the slot includes
a first slot extending in a first direction between a first feeding point and a second feeding point,
a second slot extending in a second direction different from the first direction from an end portion of the first slot in the first direction,
a third slot extending in a fourth direction opposite to the second direction from an end portion of the first slot in a third direction opposite to the first direction, reaching an open end open in the fourth direction, and
a J-shaped slot extending in a J-shape from an end portion of the second slot in the second direction to an open end open in the first direction,
wherein a slot width at an open end of the J-shaped slot is wider than a slot width at the end portion of the second slot in the second direction,
wherein the J-shaped slot includes a portion that extends in the first direction while maintaining an approximately uniform slot width, and
wherein the J-shaped slot has an outline resembling half of an ellipse with a long axis approximately parallel to the second direction.

2. The planar antenna according to claim 1, wherein the J-shaped slot has a curved outline.

3. The planar antenna according to claim 2, wherein the J-shaped slot includes a portion where a slot width gradually increases.

4. The planar antenna according to claim 1, wherein the conductor has a first outer edge where an open end of the J-shaped slot is located and a second outer edge opposite to the first outer edge, and wherein the second outer edge includes a curved portion.

5. The planar antenna according to claim 4, wherein an end portion of the second outer edge has an outline resembling ¼ or less of an ellipse with a long axis approximately parallel to the second direction.

6. The planar antenna according to claim 1, wherein a slot length of the second slot is shorter than a slot length of the first slot.

7. The planar antenna according to claim 1, wherein an outer edge where an open end of the third slot is located includes a portion parallel to an imaginary line that passes through the open end of the third slot and that extends at right angles to a direction in which the third slot extends.

8. The planar antenna according to claim 1, wherein an outer edge where an open end of the third slot is located includes a portion inclined with respect to an imaginary line that passes through the open end of the third slot and that extends at right angles to a direction in which the third slot extends.

9. The planar antenna according to claim 1, wherein the third slot includes a portion where a slot width is wider than the first slot.

10. The planar antenna according to claim 1, wherein a matching circuit connected to the first feeding point and the second feeding point is mounted on the planar antenna.

11. A vehicle window glass comprising: the planar antenna as defined in claim 1.

12. The vehicle window glass according to claim 11, comprising:

a first glass plate; and a second glass plate that faces the first glass plate, wherein the planar antenna is disposed between the first glass plate and the second glass plate.

13. The vehicle window glass according to claim 11, wherein the planar antenna is part or all of a plurality of antennas that are included in a diversity antenna or a MIMO antenna.

14. The vehicle window glass according to claim 11 that is used for a windshield, a side glass, a rear glass, or a roof glass.

15. A planar antenna comprising:

a slot formed in a flat conductor, wherein the slot includes a first slot extending in a first direction between a first feeding point and a second feeding point, a second slot extending in a second direction different from the first direction from an end portion of the first slot in the first direction, a third slot extending in a fourth direction opposite to the second direction from an end portion of the first slot in a third direction opposite to the first direction, reaching an open end open in the fourth direction, and a J-shaped slot extending in a J-shape from an end portion of the second slot in the second direction to an open end open in the first direction, wherein the J-shaped slot is a slot bent in a J-shape, and wherein the J-shaped slot includes a fourth slot extending in the third direction from another end of the second slot in the second direction, a fifth slot extending in the second direction, and a sixth slot extending in the first direction.

16. The planar antenna according to claim 15, wherein a slot width of the sixth slot is wider than a slot width of the fifth slot, and wherein the slot width of the fifth slot is wider than a slot width of the fourth slot.

17. The planar antenna according to claim 15, wherein a slot length of the fifth slot is longer than a slot length of the fourth slot and longer than a slot length of the sixth slot.

* * * * *